United States Patent
Campbell et al.

(10) Patent No.: US 7,839,801 B2
(45) Date of Patent: Nov. 23, 2010

(54) DISTRIBUTING CUSTOMER LOCATION ACCESS LINKS ACROSS NETWORK PROVIDER NODES DURING NETWORK PLANNING

(75) Inventors: Gary L. Campbell, Allen, TX (US); Paul Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 12/333,512

(22) Filed: Dec. 12, 2008

(65) Prior Publication Data

US 2010/0150028 A1 Jun. 17, 2010

(51) Int. Cl.
*H04L 12/56* (2006.01)
(52) U.S. Cl. ..................... 370/255; 370/237
(58) Field of Classification Search .......... 370/237, 370/429, 353; 707/104, 2
See application file for complete search history.

(56) References Cited

U.S. PATENT DOCUMENTS

| | | | | |
|---|---|---|---|---|
| 6,768,718 B1* | 7/2004 | Beshai et al. | ............... | 370/237 |
| 6,865,538 B2* | 3/2005 | Chithambaram et al. | ..... | 705/1.1 |
| 7,281,105 B1* | 10/2007 | Wang et al. | ................. | 711/165 |
| 7,382,773 B2* | 6/2008 | Schoeneberger et al. | .... | 370/353 |
| 2004/0056901 A1* | 3/2004 | March et al. | ................. | 345/811 |
| 2005/0228947 A1* | 10/2005 | Morita et al. | ................ | 711/114 |
| 2006/0069780 A1* | 3/2006 | Batni et al. | .................. | 709/226 |
| 2006/0190425 A1* | 8/2006 | Chang et al. | .................... | 707/2 |
| 2006/0271280 A1* | 11/2006 | O'Clair | ....................... | 701/208 |
| 2007/0245010 A1* | 10/2007 | Arn et al. | ..................... | 709/223 |
| 2008/0039121 A1* | 2/2008 | Muller et al. | ............. | 455/456.3 |
| 2008/0114840 A1* | 5/2008 | Rollin et al. | ................ | 709/206 |
| 2008/0172375 A1* | 7/2008 | Burges et al. | .................. | 707/5 |
| 2009/0037174 A1* | 2/2009 | Seltzer et al. | ............... | 704/251 |
| 2009/0070379 A1* | 3/2009 | Rappaport | ............... | 707/104.1 |
| 2009/0150156 A1* | 6/2009 | Kennewick et al. | ......... | 704/257 |
| 2009/0168795 A1* | 7/2009 | Segel | ......................... | 370/429 |

* cited by examiner

*Primary Examiner*—Thong H Vu

(57) ABSTRACT

A computing-device implemented network planning process distributes access links associated with customer locations to selected nodes of a provider network. The network planning process distributes the access links associated with the customer locations to the selected nodes of provider network such that overall latency goals for the network are met and such that the density of the connected customer locations to the network nodes in the network satisfy density requirements. The network planning process seeks diversity in customer location assignments by creating additional capacity through the re-assignment of customer locations to alternate network nodes in order to free up space on network nodes needed to off-load customer locations from other over-loaded network nodes. The network planning process permits an expanded ring of network nodes to accommodate dense customer traffic load across a wide area while meeting both individual connection and overall system requirements.

20 Claims, 22 Drawing Sheets

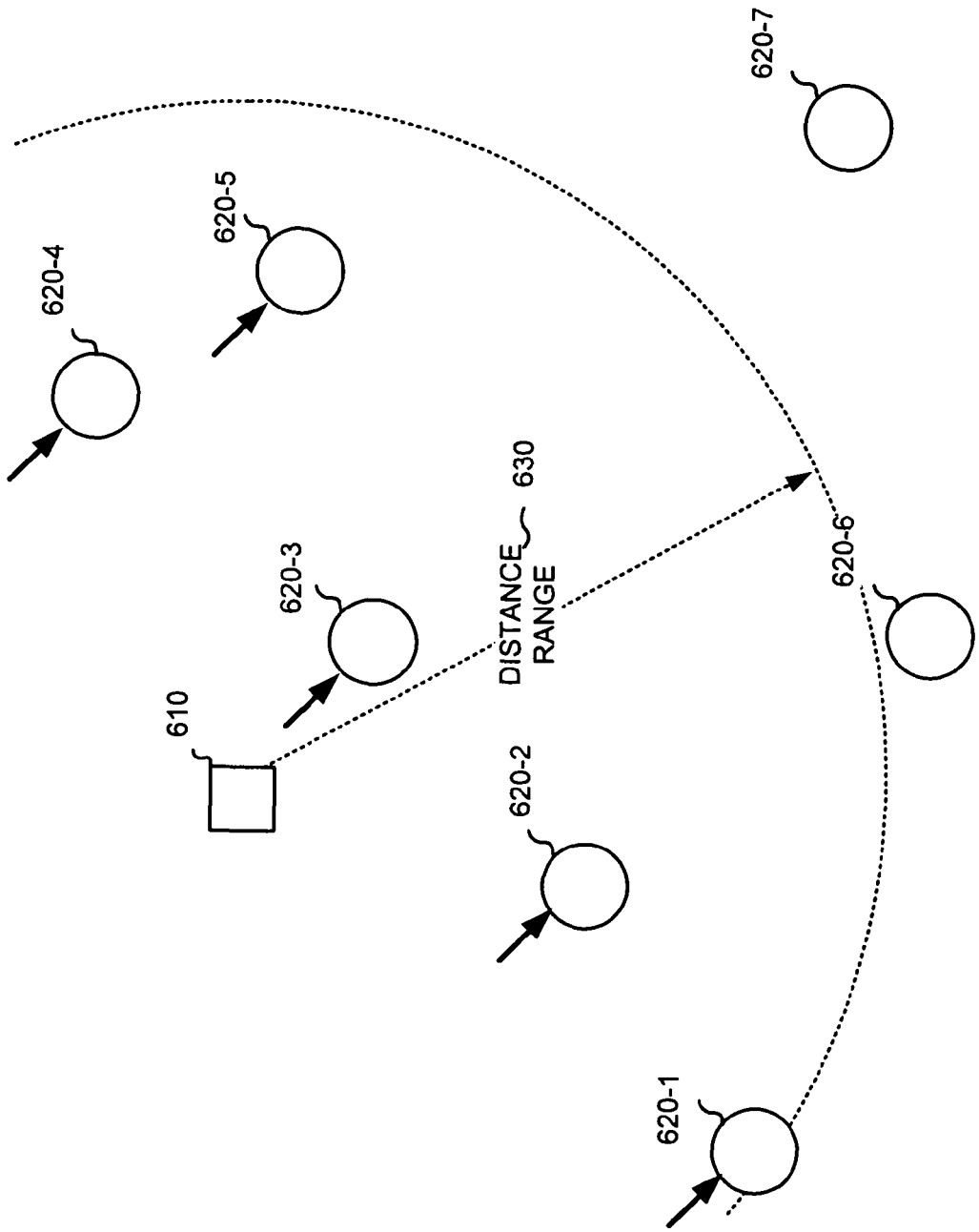

DISTRIBUTING CUSTOMER LOCATION ACCESS LINKS ACROSS NETWORK PROVIDER NODES DURING NETWORK PLANNING

BACKGROUND

Network planning, such as, for example, planning for the connection of customer locations to existing nodes of a provider network, typically involves a manual assignment process that is time intensive, prone to error, and recursive. The human planner, based on known network requirements and constraints, may analyze a network map for the purpose of selecting network nodes to which to distribute respective customer locations for connection via access links. Typically, the network planning performed by the human planner involves a recursive process of trial and error that does not take into account overall network latencies and which fails to adequately address customer location density requirements.

BRIEF DESCRIPTION OF THE DRAWINGS

FIG. 6A is a diagram that illustrates the identification of network nodes within a certain distance of a customer location;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
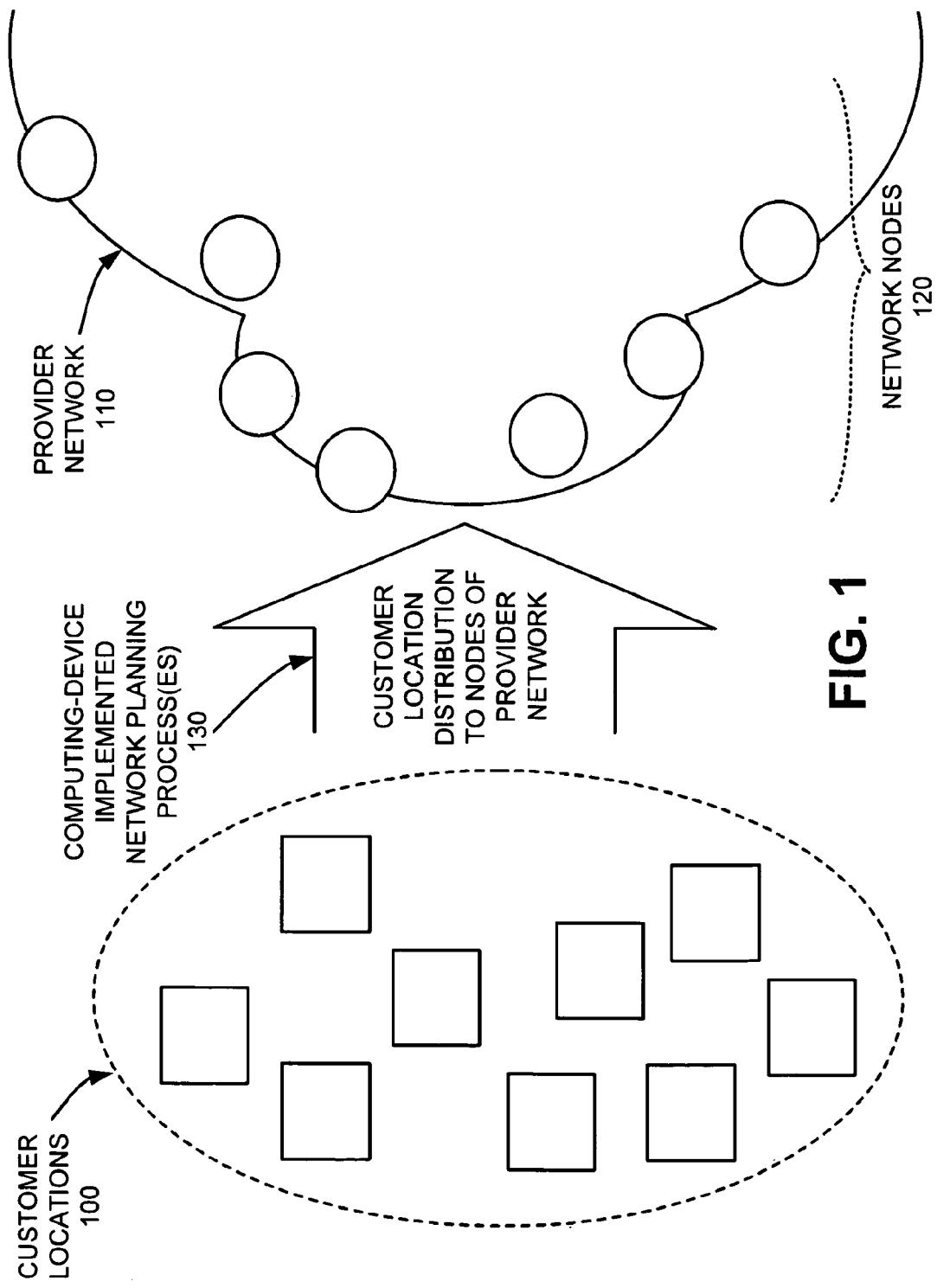
FIG. 1 is a diagram of an overview of exemplary implementations described herein.

FIG. 1 is a diagram of an overview of exemplary implementations described herein in which an automated computing-device implemented network planning process may be used to distribute customer location access links across network nodes of a network provider. As shown in FIG. 1, multiple customer locations 100 may be proposed to be connected/re-connected to a provider network 110, where provider network 110 may include multiple network nodes 120 that are available for handling additional traffic from customer locations 100. Customer locations 100 may include, for example, customer premises equipment (CPE) or private or regional networks. Network nodes 120 may include, for example, network provider edge (PE) nodes that may switch traffic to and from provider network 110.

As described in further detail below, a computing-device implemented network planning process (or processes) 130 may distribute access links associated with customer locations to selected nodes of provider network 110. Process(es) 130 may distribute the access links associated with the customer locations to the selected nodes of provider network 110 such that overall latency goals for network 110 are met and such that the density of the connected customer locations to network nodes 120 in network 110 satisfy density requirements. Process(es) 130, described in detail below, seeks diversity in customer location assignments by creating additional capacity through the re-assignment of customer locations to alternate network nodes in order to free up space on network nodes needed to off-load customer locations from other over-loaded network nodes. Process(es) 130 permit an expanded ring of network nodes to accommodate dense customer traffic load across a wide area while meeting both individual connection and overall system requirements.

Figure 2A:
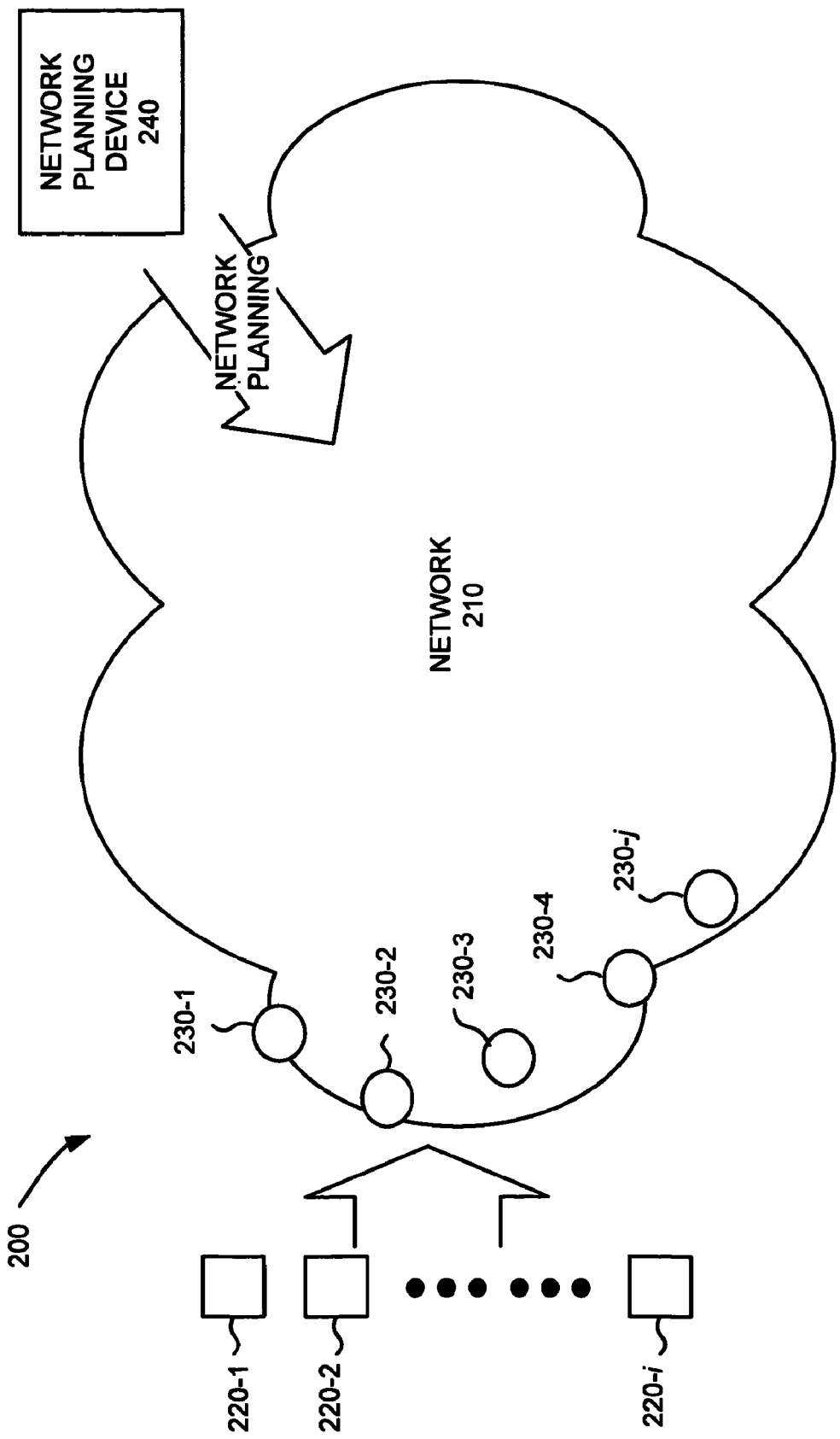
FIG. 2A is a diagram that illustrates an exemplary environment to which the network planning process of FIG. 1 may be applied to distribute customer location access links across network nodes of a network provider.

FIG. 2A illustrates an exemplary environment 200 to which the network planning process(es) of FIG. 1 may be applied to distribute customer location access links across network nodes of a network provider. As shown in FIG. 2A, multiple customer locations 220-1 through 220-$i$ (corresponding to customer locations 100 of FIG. 1) may be identified for connection/re-connection to a network 210 (corresponding to provider network 110 of FIG. 1). Network 210 may include multiple network nodes 230-1 through 230-$j$ that are available for handling access links and associated traffic from customer locations 220-1 through 220-$i$. As shown in FIG. 2A, a network planning device 240 may implement the network planning process for distributing customer location access links from customer locations 220-1 through 220-$i$ to selected network nodes of network 210. Network planning device 240 may include, for example, a desktop, laptop or palmtop computer, a server, a cellular radiotelephone, a personal digital assistant (PDA), a Personal Communications Systems (PCS) terminal, or any other type of device or appliance that includes computational functionality.

Network 210 may include one or more networks of any type, including a local area network (LAN); a wide area network (WAN); a metropolitan area network (MAN); a telephone network, such as a Public Switched Telephone Network (PSTN) or a Public Land Mobile Network (PLMN); a satellite network; an optical network; an intranet, the Internet; or a combination of networks. The PLMN(s) may further include a packet-switched network, such as, for example, General Packet Radio Service (GPRS), Cellular Digital Packet Data (CDPD), or Mobile IP network.

Figure 2B:
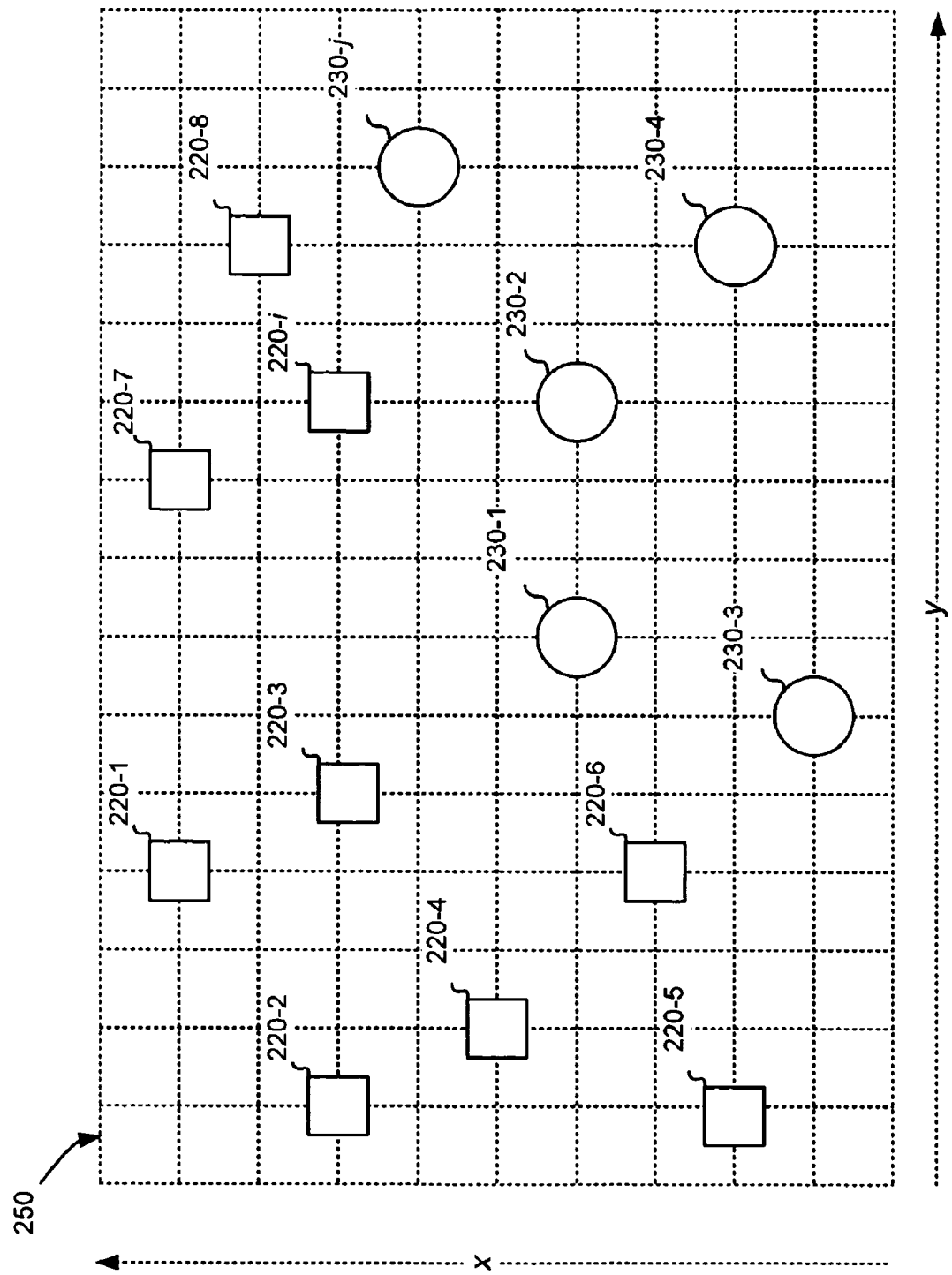
FIG. 2B is a diagram that depicts an illustrative example of a position mapping associated with customer locations and network nodes of FIG. 2A.

FIG. 2B depicts an illustrative example of a position mapping 250 associated with customer locations 220-1 through 220-$i$ and network nodes 230-1 through 230-$j$. Position mapping 250 may be used for representing a geographic location of each of customer locations 220-1 through 220-$i$ and network nodes 230-1 through 230-$j$. As shown in FIG. 2B, each customer location and network node location may be represented by an x and y position in position mapping 250. The geographic positions of network nodes 230-1 through 230-*j* may have been identified at the time of network design and implementation, and may be provided to network planning device 240 as an input file. The positions of each of customer locations 220-1 through 220-*i* may, for example, be determined by geographic position analysis (e.g., GPS position measurements) and may be provided to network planning device 240 as another input file.

Figure 3:
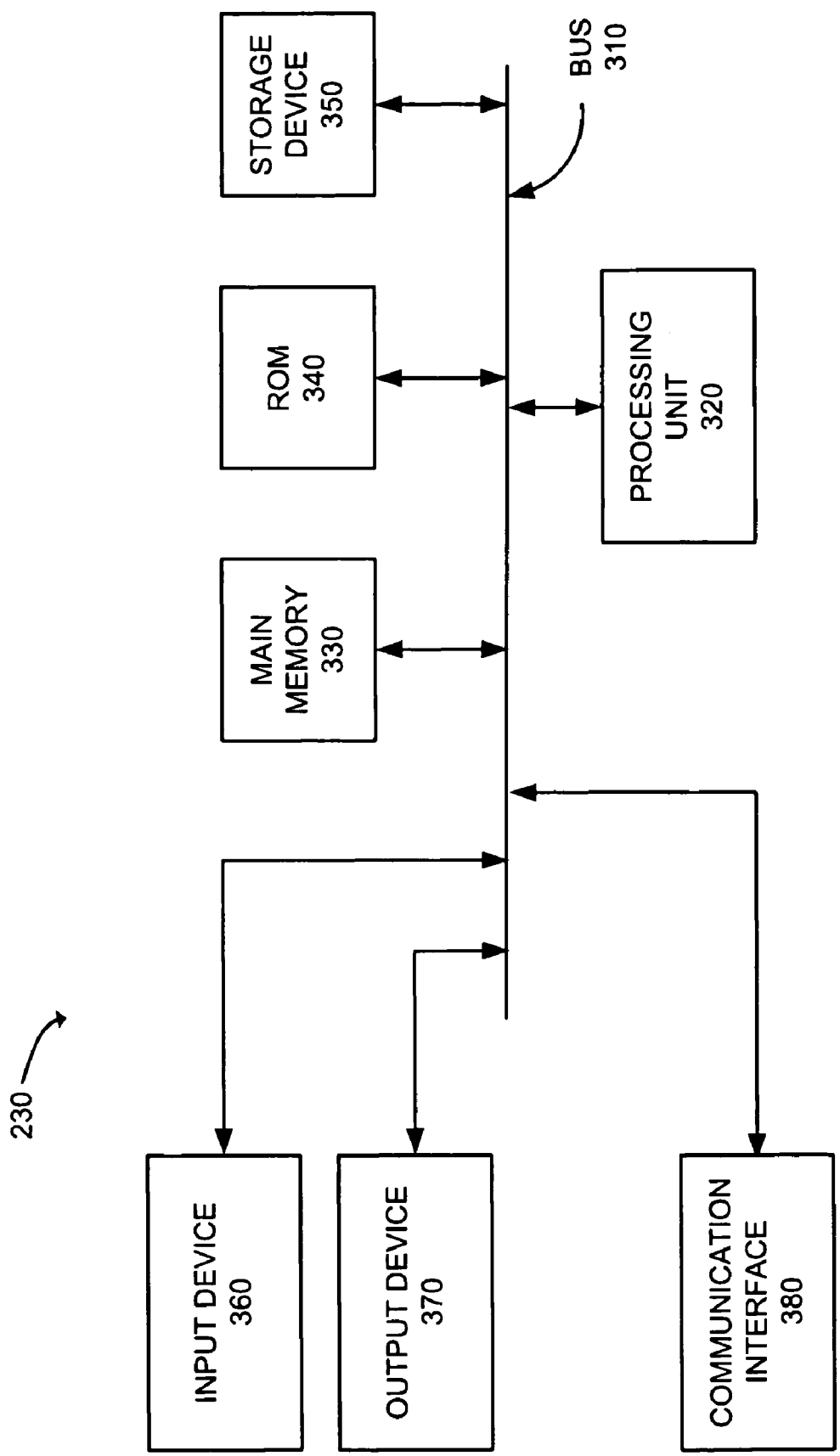
FIG. 3 is a diagram of the network planning device of FIG. 2A according to an exemplary implementation.

FIG. 3 is a diagram of network planning device 240 according to an exemplary implementation. Network planning device 240 may include a bus 310, a processing unit 320, a main memory 330, a read only memory (ROM) 340, a storage device 350, an input device 360, an output device 370, and a communication interface 380. Bus 310 may include a path that permits communication among the elements of network planning device 240.

Processing unit 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processing unit 320. Storage device 350 may include a magnetic and/or optical recording medium and its corresponding drive.

Input device 360 may include a mechanism that permits an operator to input information to device 240, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables device 240 to communicate with other devices and/or systems. For example, communication interface 380 may include mechanisms for communicating with another device or system via a network, such as network 210.

Network planning device 240 may perform certain operations or processes described herein. Network planning device 240 may perform these operations in response to processing unit 320 executing software instructions contained in a computer-readable medium, such as memory 330. A computer-readable medium may be defined as a physical or logical memory device. Each of main memory 330, ROM 340 and storage device 350 may include computer-readable mediums. The magnetic and/or optical recording mediums (e.g., readable CDs or DVDs) of storage device 350 may also include computer-readable mediums.

The software instructions may be read into memory 330 from another computer-readable medium, such as data storage device 350, or from another device via communication interface 380. The software instructions contained in memory 330 may cause processing unit 320 to perform operations or processes that will be described later. Alternatively, hardwired circuitry may be used in place of or in combination with software instructions to implement processes described herein. Thus, implementations consistent with the principles of the invention are not limited to any specific combination of hardware circuitry and software.

FIGS. 4A-4G are flow diagrams illustrating a first exemplary process for network planning that distributes customer locations across nodes of a provider network such that a desired load distribution may be achieved. The exemplary process of FIGS. 4A-4G may be implemented by network planning device 240. In other implementations, the exemplary process of FIGS. 4A-4G may be implemented by other devices in conjunction with network planning device 240, or by a device or devices other than network planning device 240. The exemplary process of FIGS. 4A-4G may include a sequence of instructions stored in a computer-readable medium (e.g., main memory 330, ROM 340 and/or storage device 350) that may be executed by processing unit 320 of network planning device 240.

Figures 5A, 5B:
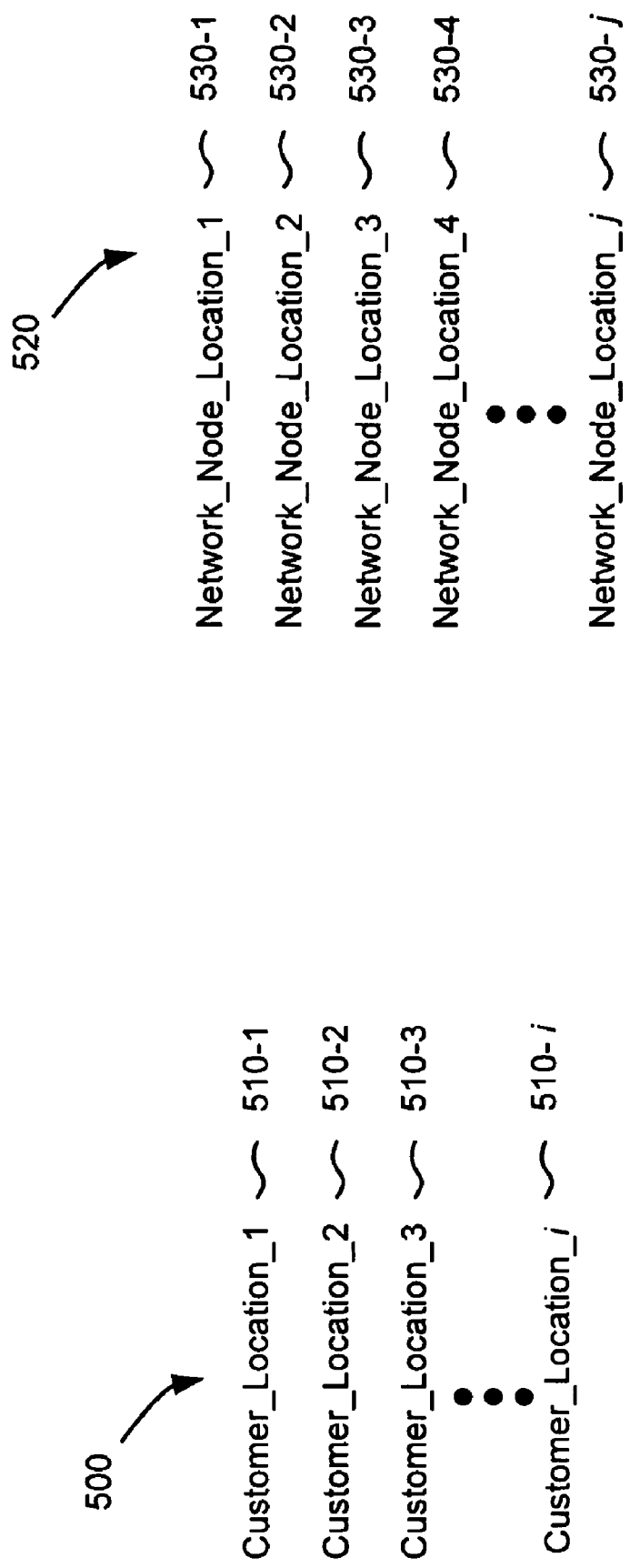
FIG. 5A is a diagram that illustrates an exemplary customer location list that may be input into the network planning process of FIG. 1.
FIG. 5B is a diagram that illustrates an exemplary network node location list that may be input into the network planning process of FIG. 1.

The exemplary process may begin with the receipt of a list of customer locations for i customers (block 400). For example, referring back to FIG. 2B, network planning device 240 may receive x and y coordinates for each of customer locations 220-1 through 220-*i* in the x-y coordinate system of position mapping 250. The i customers may include, for example, a collection of customer locations proposed to be connected or re-connected to network 210. FIG. 5A depicts an example of a customer location list 500 that may be received by network planning device 240. As shown in FIG. 5A, customer location list 500 may include a list of multiple customer locations 510-1 through 510-N.

Locations of nodes $N_j$ in a network may be received (block 402). Referring also to FIG. 2B, x and y coordinates for each of network nodes 230-1 through 230-*j*, that correspond to existing network nodes in network 210, may be received. The j network nodes may include, for example, each network provider edge node in network 210 to which customer locations may be connected to obtain network service. FIG. 5B illustrates an exemplary network node location list 520 that may be generated that includes a list of the locations 530-1 through 530-*j* associated with, for example, each of the network provider edge nodes of network 210.

For each customer location in the list of customer locations, network nodes that are nearest to the customer location and within a specified distance range of the customer location may be identified (block 404). FIG. 6A depicts an illustrative example of the identification of the nearest network nodes to a customer location within a specified range of the customer location. As shown in FIG. 6A, network nodes 620-1 through 620-5 are identified as being the nearest network nodes within a distance range 630 of customer location 610. As further shown in FIG. 6A, network nodes 620-6 and 620-7 are outside of distance range 630 and, therefore, are not identified as nearest nodes to customer location 610. An increasing hierarchy of distance ranges may be specified, with the first distance range being the shortest distance range and each subsequent distance range (e.g., selected in block 432 below) being longer and longer distance ranges extending out from the customer location. For example, a set of distance ranges may include 1 kilometer (km), 10 km and 100 km.

Figure 6B:
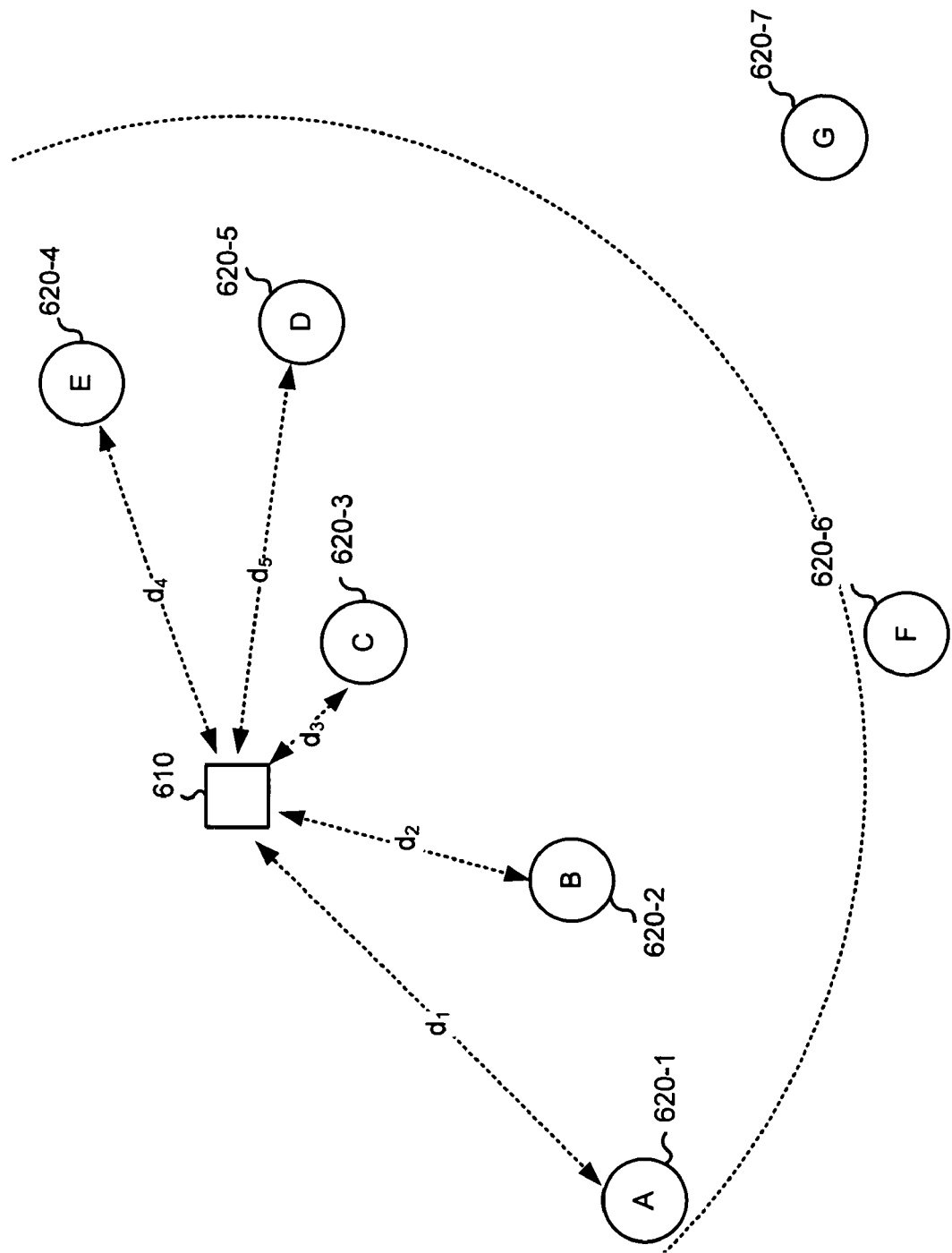
FIG. 6B is a diagram that illustrates the distances between the customer location and each of the identified network nodes of FIG. 6A.
Figure 7:
FIG. 7 is a diagram that illustrates an example of a list that ranks the nearest network nodes to a given customer location.

The identified nearest network nodes may be ranked for each customer location in an order from closest to farthest to generate a ranked list for each customer location (block 406). FIG. 6B depicts a distance determination being made for each of the identified nearest network nodes 620-1 through 620-5. FIG. 7 further shows nearest network nodes 620-1 through 620-5 ranked in a ranked list 700 as a result of the distances determined in FIG. 6B. As shown in FIG. 7, network node C 620-3 is determined to be the closest to customer location 610 and, therefore, is ranked first in list 700. Network node B 620-2 is determined to be second-closest to customer location 610 and, therefore, is ranked second in list 700. Network node E 620-4 is determined to be third-closest to customer location 610 and, therefore, is ranked third in list 700. Network node D 620-5 is determined to be fourth closest to customer location 610 and, therefore, is ranked fourth in list 700. Network node A 620-1 is determined to be fifth closest to customer location 610 and, therefore, is ranked fifth in list 700.

A next customer location may be selected from the list of customer locations (block 408). If this is the first execution of block 408 in the exemplary process of FIGS. 4A-4G, the "next customer location" may include the first customer location in the customer location list. If this is a subsequent execution of block 408 in the exemplary process of FIGS. 4A-4G, the "next customer location" may include each subsequent customer location contained in the customer location list.

A next nearest network node may be selected from the ranked list for the selected customer location (block 410). A next nearest network node may be selected from the ranked list of nearest network nodes obtained in block 406 above. If this is the first execution of block 410 in the exemplary process of FIGS. 4A-4G, the "next nearest network node" may include the first network node in the ranked list. If this is a subsequent execution of block 410, the "next nearest network node" may include subsequent nearest network nodes retrieved in order from the ranked list for the customer location.

A determination may be made whether the nearest network node is overloaded (block 412). A maximum loading threshold for each network node 230 in network 210 may be preset. The maximum loading threshold may be defined, for example, in terms of a maximum number of customer locations that may be connected to a single network node. The maximum loading threshold may be defined in conjunction with, or by, other parameters than the maximum number of customer locations. As a specific example, if the maximum loading threshold is set at 10 customer locations, and it is determined that the nearest network node to a given customer location already is loaded with 9 customer locations, it may be determined that connecting the given customer location to the nearest network node would overload the network node.

Figure 4A:
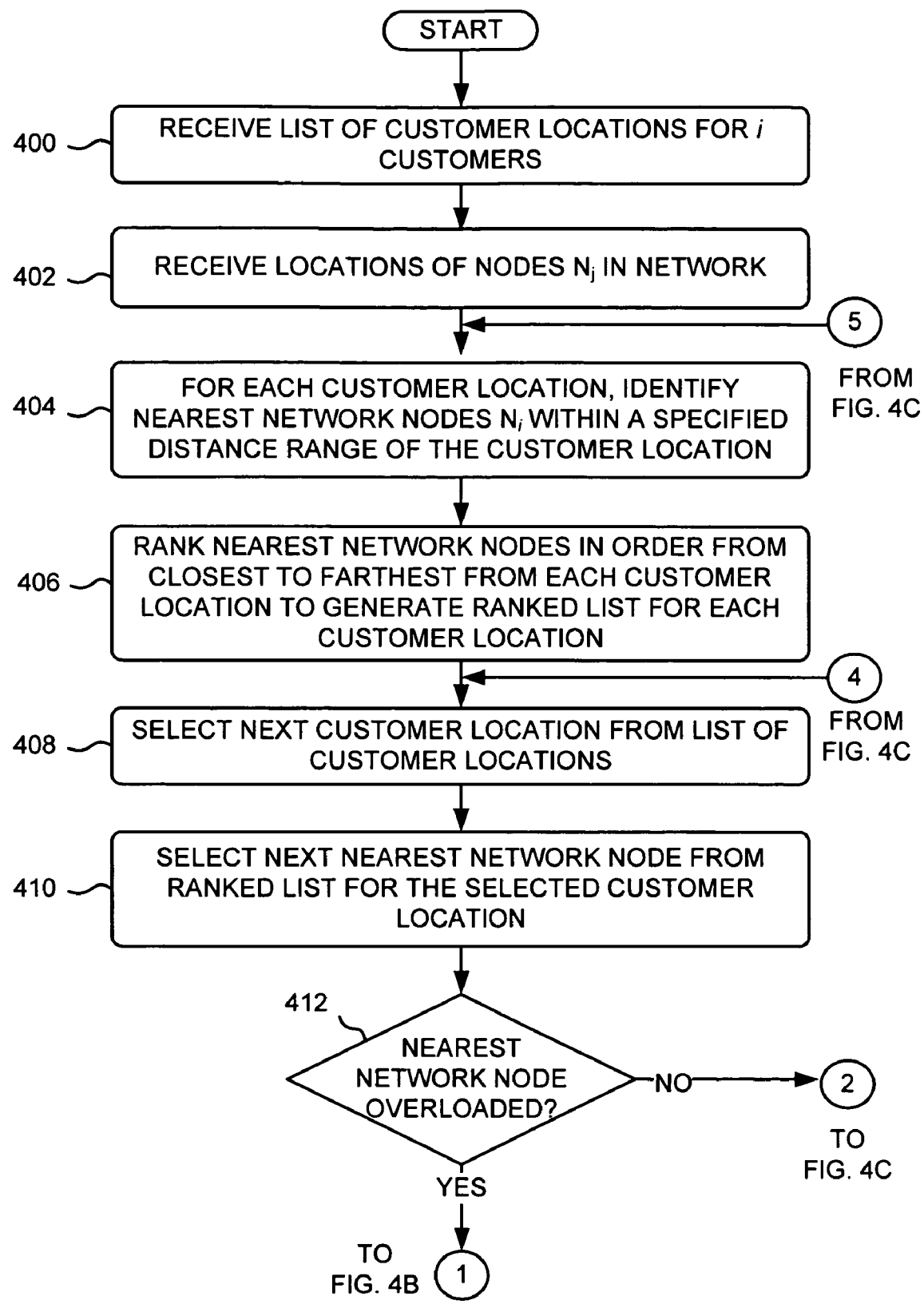
FIGS. 4A-4G are a flow diagrams illustrating a first exemplary process for network planning that distributes customer locations across nodes of a provider network such that a desired load distribution may be achieved.
Figure 4B:
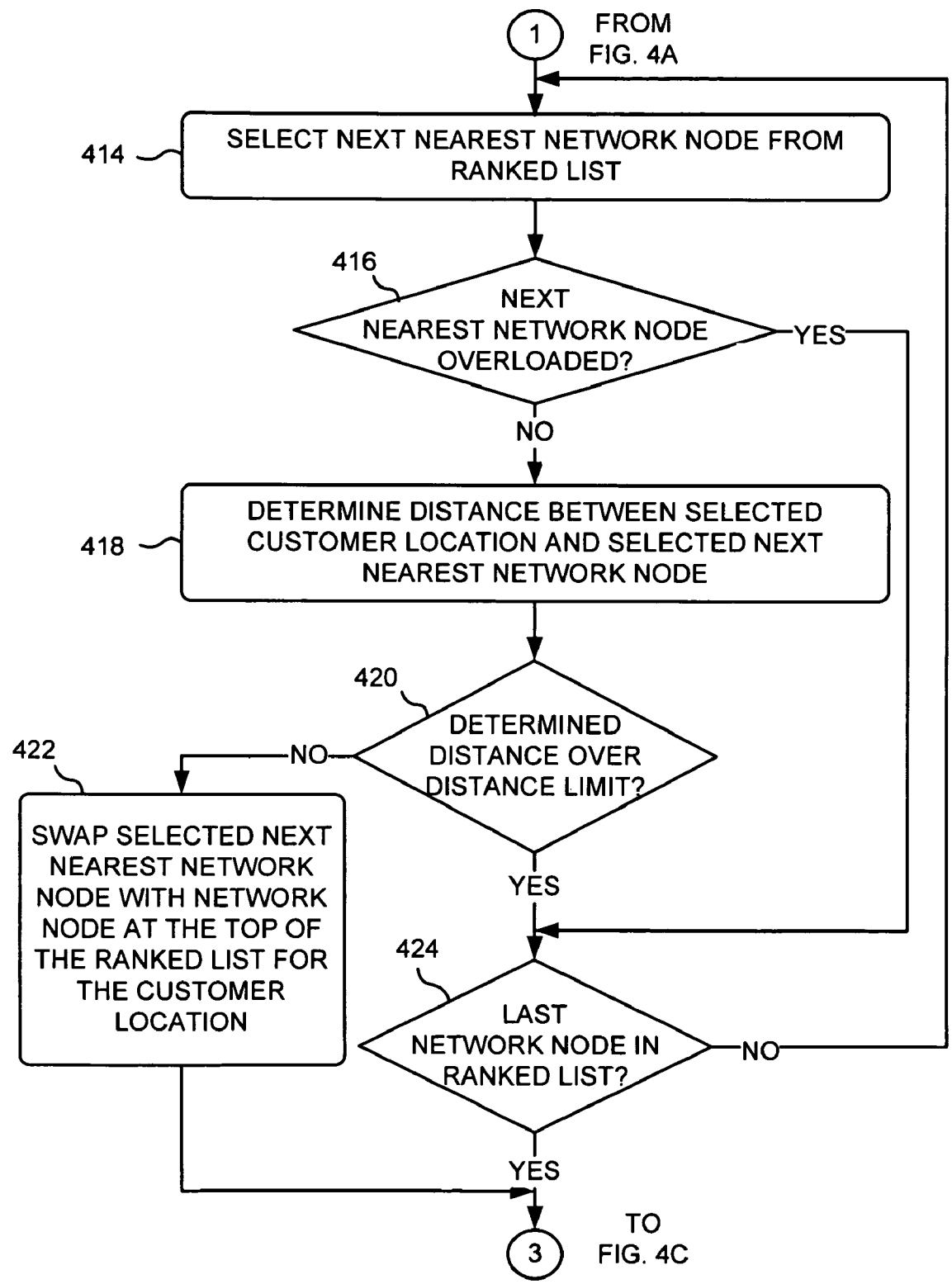
Figure 4C:
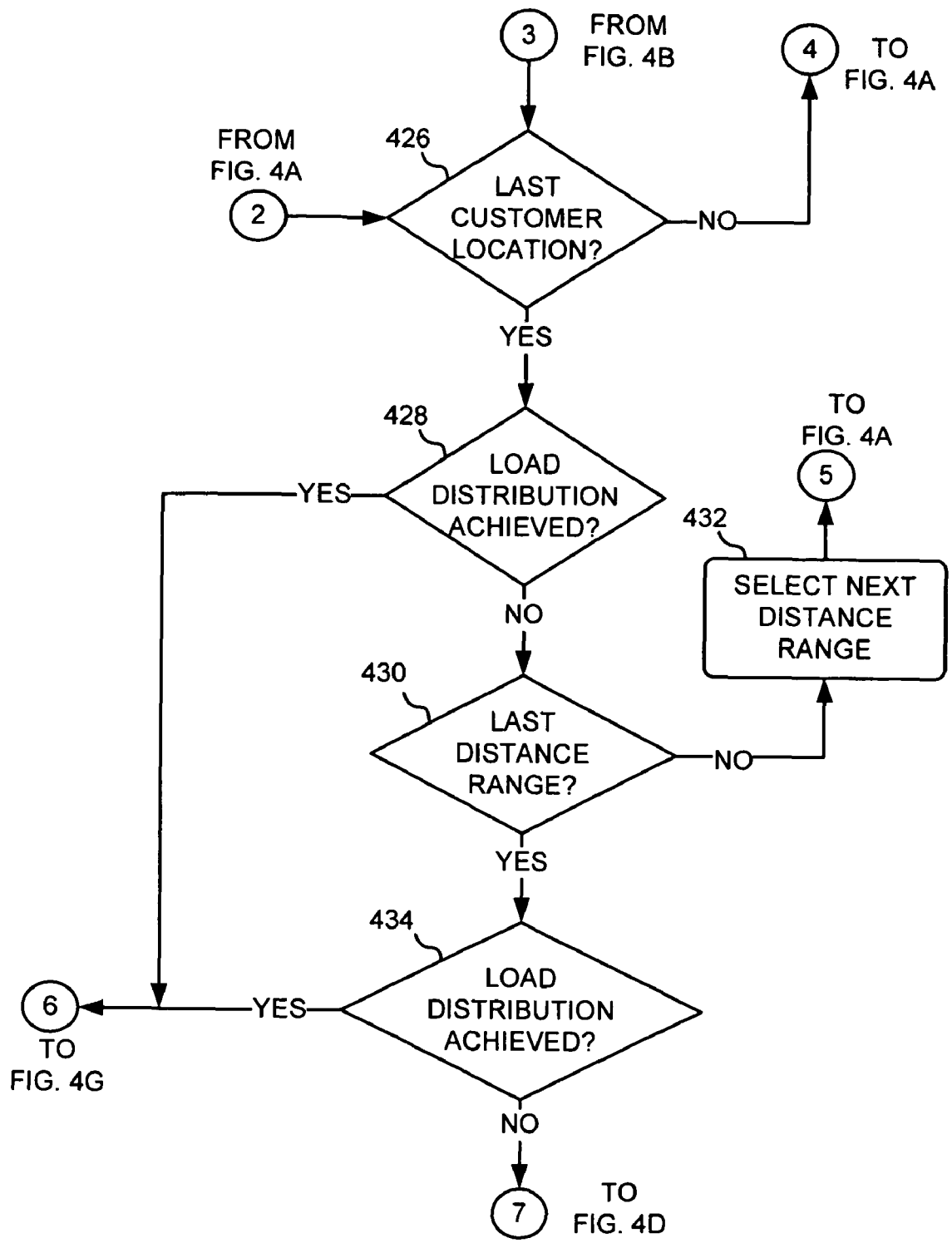

If the nearest network node is not overloaded (NO—block 412), the exemplary process may continue at block 426 in FIG. 4C with a determination of whether a last customer location in the customer location list has been processed. If the nearest network node is overloaded (YES—block 412), the exemplary process may continue in FIG. 4B with a next nearest network node being selected from the ranked list (block 414). The next nearest network node selected from the ranked list may include the next ranked network node in the ranked list after the previously selected network node. Referring to ranked network node list 700 of FIG. 7, if it is determined that network node C 620-3 is overloaded, network node B 620-2 may be selected from list 700 as the next ranked network node.

A determination may be made whether the next nearest network node is overloaded (block 416). The current loading of the selected nearest network node may be compared to the maximum loading threshold to determine if the network node will be overloaded by connection of the customer location to the network node. If the next nearest network node is overloaded (YES—block 416), the exemplary process may continue at block 424 below. If the next nearest network node is not overloaded (NO—block 416), a distance between the selected customer location and the selected next nearest network node may be determined (block 418). The distance may be determined in terms of a geographic distance, with the geographic distance serving as an indication of a latency associated with a connection between the customer location and the network node.

A determination may be made whether the determined distance is over a particular distance limit (block 420). A pre-determined distance limit may be set that limits the maximum distance that a given customer location may be from a given network node. This pre-determined distance limit may be based on a maximum desired latency between the given customer location and the given network node. If the determined distance is not over the distance limit (NO—block 420), the selected next nearest network node may be swapped with a network node currently at the top of the ranked list for the customer location (block 422). If a comparison of a determined distance between the customer location and the nearest network node determines that the determined distance is less than the distance limit, the nearest network node may be swapped with the current network node at the top of the ranked list (i.e., with the network node at the top of the list being the best current candidate for serving the customer location). Referring to the example of FIG. 7, network node B 620-2 may be swapped with network node C 620-3 thereby moving network node B 620-2 into the first ranked position in list 700 and moving network node C 620-3 into the second ranked position in list 700.

If the determined distance is over the distance limit (YES—block 420), a determination may be made whether the current selected next nearest network node is a last network node in the ranked list for the customer location (block 424). Referring to FIG. 7 as an example, if the current selected network node is network node D 620-5, it may be determined that there is still another network node in ranked list 700 (e.g., network node A 620-1) and that network node D 620-5 is not the last network node in the list. If the current selected nearest network node is not the last network node in the ranked list, the exemplary process may return to block 414 with the selection of a next nearest node from the ranked list for the customer location. Referring to FIG. 7 as an example, network node E 620-4 may be selected from ranked list 700 as the next nearest network node after network node B 620-2.

If the current selected next nearest network node is the last network node in the ranked list for the customer location (YES—block 424), the exemplary process may continue in FIG. 4C with a determination if the last customer location in the customer location list has been processed (block 426). If the last customer location in the customer location list has not been processed (NO—block 426), the exemplary process may return to block 408 with the selection of a next customer location from the list of customer locations. Referring to the example of FIG. 5A, if customer location 2 510-2 was the most recent customer location processed, customer location 3 510-1 may be selected from customer location list 500. If the last customer location in the customer location list has been processed (YES—block 426), a determination may be made whether an acceptable load distribution has been achieved (block 428). An acceptable load distribution may include satisfying any number of load criteria set by the network planner that satisfies overall network latency goals and customer location density parameters. If an acceptable load distribution has been achieved (YES—block 428), the exemplary process may be complete. If an acceptable load distribution has not been achieved (NO—block 428), a determination may be made whether a last distance range has been reached (block 430). The last distance range may include the highest distance range in the hierarchy of pre-determined distance ranges specified by the network planner.

If there are additional distance ranges to be covered (NO—block 430), a next distance range may be selected (block 432) and the exemplary process may return to block 404, with the identification of the nearest network nodes within the selected next distance range of each customer location of the customer location list. For example, if the set of pre-determined distance ranges comprises 1 km, 10 km and 100 km, then the 10 km distance range may be selected after completion of the 1 km distance range.

Figure 4D:
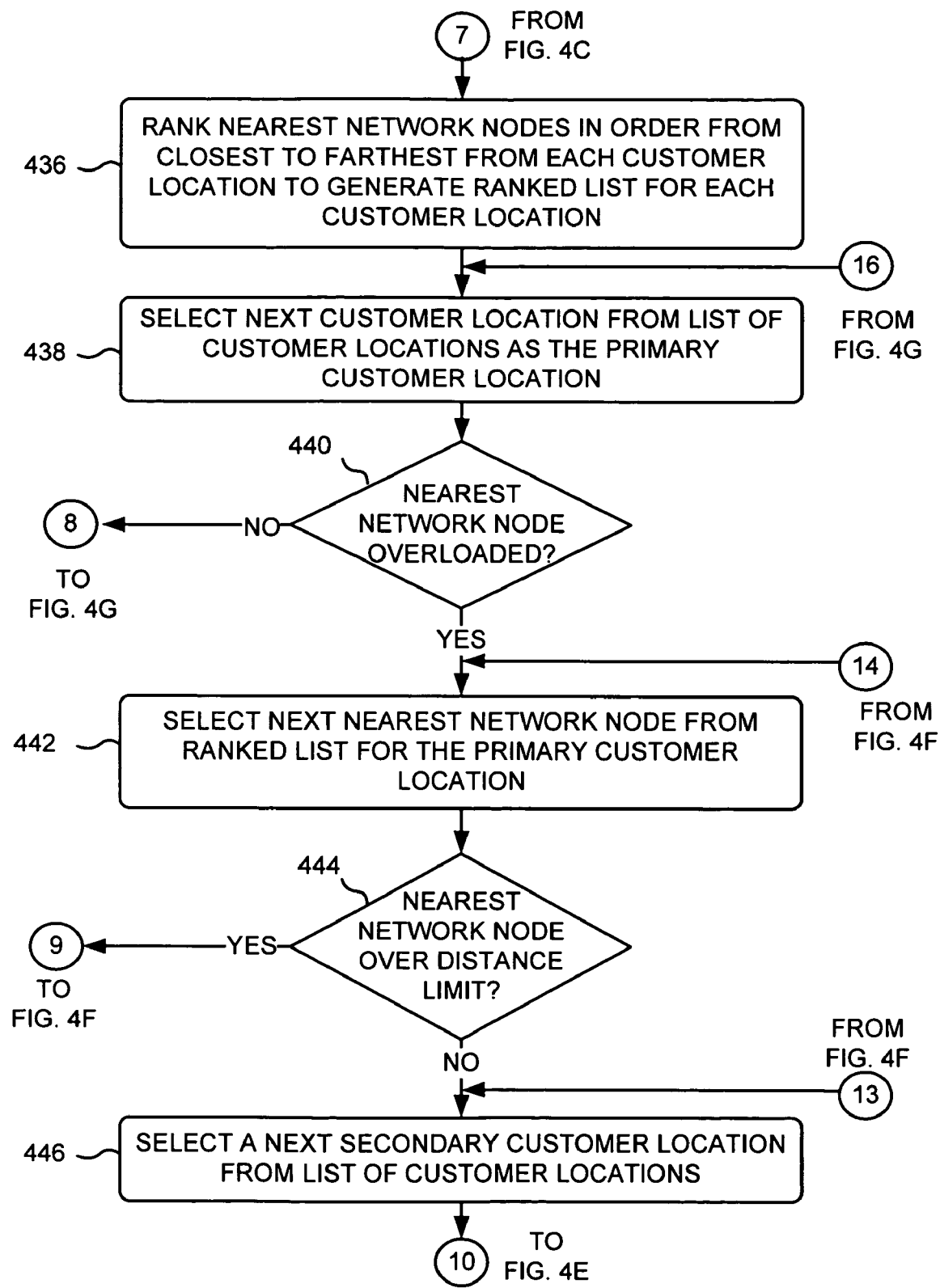

If it is determined that there are no additional distance ranges to be covered (YES—block 430), a determination may be made whether an acceptable load distribution has been achieved (block 434). An acceptable load distribution may include satisfying any number of load criteria set by the network planner that satisfies overall network latency goals and customer location density parameters. If an acceptable load distribution has been achieved (YES—block 434), the exemplary process may be complete. If an acceptable load distribution has not been achieved (NO—block 434), the exemplary process may continue at block 436 below (FIG. 4D).

For each customer location in the customer location list, the nearest network nodes may be ranked in order from closest to farthest in relation to the customer location (block 436). This ranking may be similar to that performed in block 406 above for those network nodes within a certain distance of each customer location. A next customer location may be selected as a primary customer location from the list of customer locations (block 438). If this is the first time block 438 has been executed, the next customer location that is selected as the primary customer location may be the first customer location in the customer location list. If this is not the first time block 438 has been executed, a next customer location, that is subsequent to the previous customer location in the customer location list, may be selected as the primary customer location.

It may be determined whether the nearest network node to the selected primary customer location is overloaded (block 440). The current loading of the nearest network node may be compared to the maximum loading threshold to determine if the network node will be overloaded by connection of the primary customer location to the network node. If the nearest network node is not overloaded (NO—block 440), the exemplary process may continue at block 470 (FIG. 4G below). If the nearest network node is overloaded (YES—block 440), a next nearest network node may be selected from the ranked list for the primary customer location (block 442). Thus, the network node ranked directly after the previous nearest network node may be selected from the ranked list.

It may be determined if the selected nearest network node is over a distance limit (block 444). A pre-determined distance limit may be set that limits the maximum distance that a given network node may be from a given customer location. This predetermined distance limit may be based on a maximum desired latency between the given network node and the given customer location. If the selected nearest network node is over the distance limit (YES—block 444), the exemplary process may continue at block 464 (FIG. 4F) below. If the selected nearest network node is not over the distance limit (NO—block 444), a next secondary customer location may be selected from the list of customer locations (block 446). A next secondary customer location may include a customer location from the customer location list that is different than the primary customer location and that has not previously been selected as a secondary customer location.

Figure 4E:
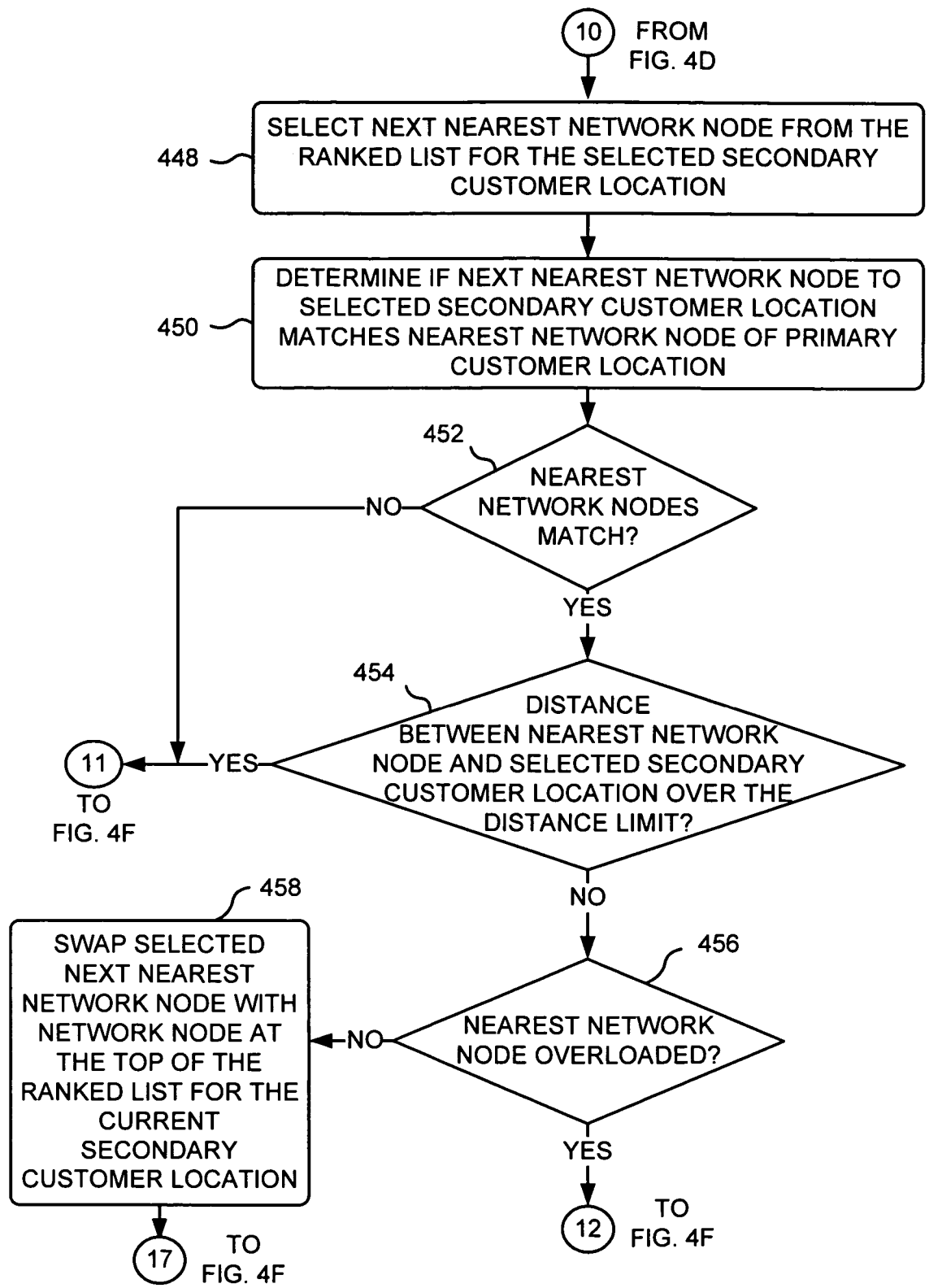

A next nearest network node may be selected from the ranked list for the selected secondary customer location (block 448, FIG. 4E). The ranked list for the selected secondary customer location may be inspected and a next nearest network node may be selected from the list. If this is the first execution of block 448, the next nearest network node may include the first nearest network node in the ranked list. If this is not the first execution of block 448, the next nearest network node may include a network node ranked in the list after the previously selected nearest network node. Referring to FIG. 7 as an example of a ranked list of network nodes associated with a secondary customer location, network node C 620-3 may be selected from ranked list 700.

Figure 4F:
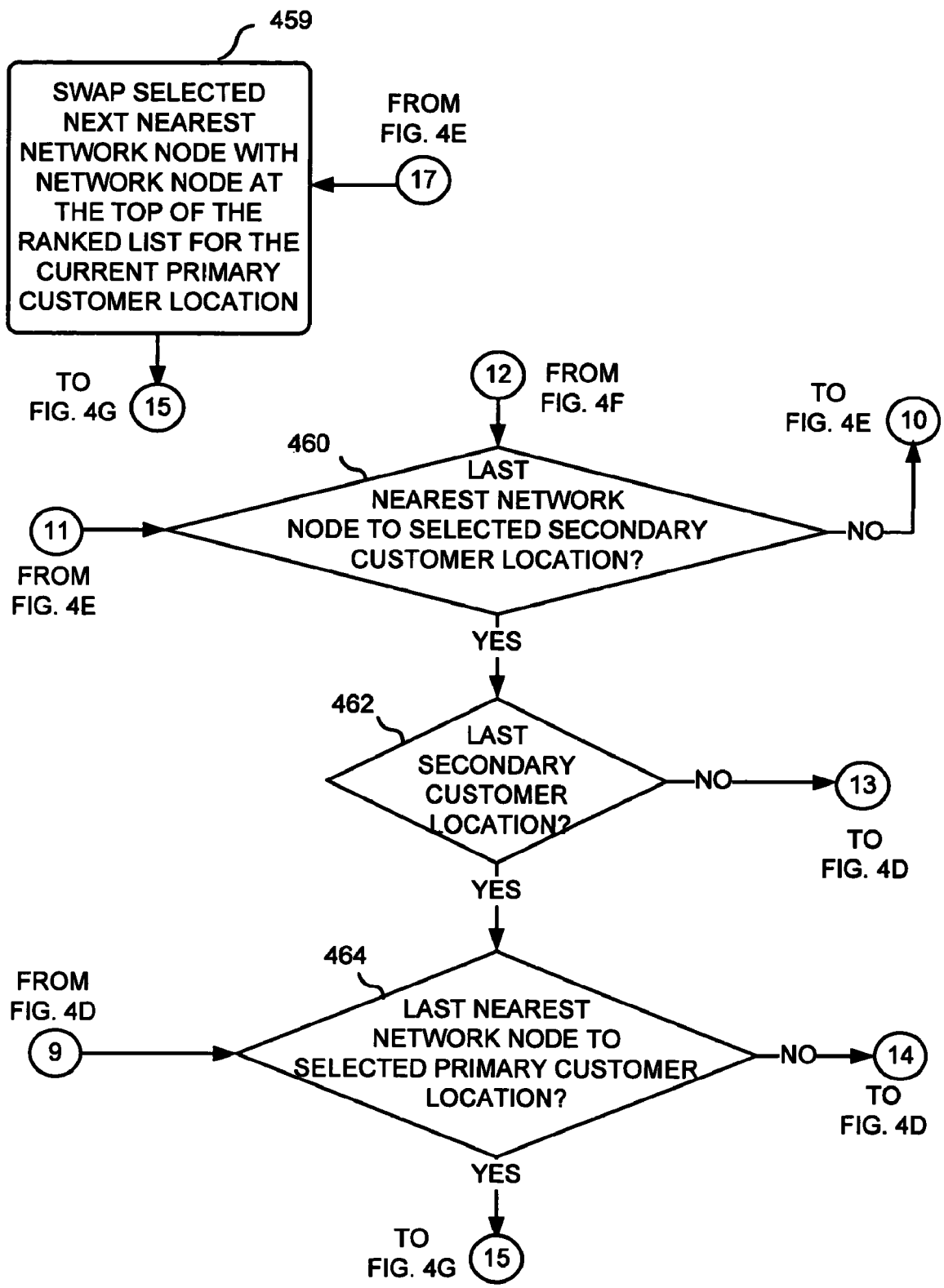
Figure 4G:
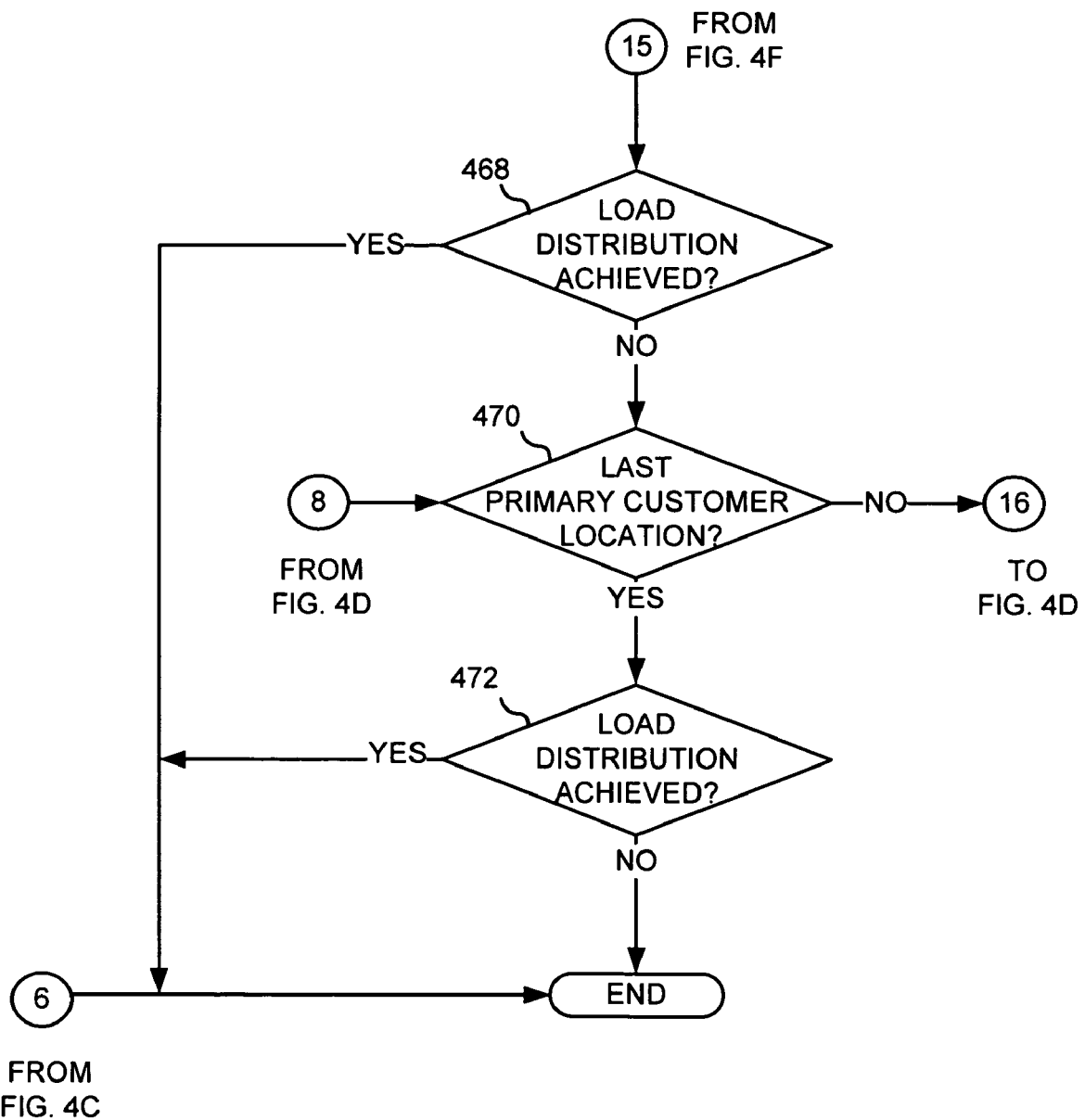

A determination may be made if the next nearest network node to the selected secondary customer location matches the nearest network node of the primary customer location (block 450). Therefore, the nearest network node selected in block 448 may be compared with the nearest network node selected in block 442. If the nearest network node for the secondary customer location does not match the nearest network node of the primary customer location (NO—block 452), the exemplary process may continue at block 460 below (FIG. 4F). If the next nearest node to the selected secondary customer location matches the nearest network node of the primary customer location (YES—block 452), a determination may be made whether the distance between the nearest network node and the selected secondary customer location is over the pre-determined distance limit (block 454). If the distance between the nearest network node and the selected secondary customer location is over the distance limit (YES—block 454), the exemplary process may continue at block 460 below (FIG. 4F).

If the distance between the nearest network node and the selected secondary customer location is not over the distance limit (NO—block 454), a determination may be made whether the nearest network node for the selected secondary customer location is overloaded (block 456). If the nearest network node for the selected secondary customer location is overloaded (YES—block 456), the exemplary process may continue at block 460 below (FIG. 4F). If the nearest network node for the selected secondary customer location is not overloaded (NO—block 456), the selected nearest network node for the selected secondary customer location may be swapped with the network node at the top of the ranked list for the current secondary customer location (block 458). The selected nearest network node for the current primary customer location may then be swapped with the network node at the top of the ranked list for the current primary customer location (block 459) (FIG. 4F). The exemplary process may continue at block 468 below (FIG. 4G).

At block 460, a determination may be made whether the current selected nearest network node for the selected secondary customer location is the last nearest network node in the secondary customer location's ranked list (block 460). If the current selected nearest network node for the selected secondary customer location is not the last nearest network node in the ranked list (NO—block 460), the exemplary process may return to block 448 with the selection of a next nearest network node from the secondary customer location's ranked list. If the current selected nearest network node for the selected secondary customer location is the last nearest network node in the ranked list (YES—block 460), a determination may be made whether the selected secondary customer location is the last customer location in the customer location list (block 462). If the selected secondary customer location is not the last customer location in the customer location list (NO—block 462), the exemplary process may return to block 446 (FIG. 4D) with the selection of a next secondary customer location from the list of customer locations. If the selected secondary customer location is the last customer location in the customer location list (YES—block 462), a determination may be made whether the selected nearest network node for the primary customer location is the last nearest network node in the primary customer location's ranked list (block 464). If the selected nearest network node for the primary customer location is not the last nearest network node in the ranked list (NO—block 464), the exemplary process may return to block 442 above (FIG. 4D) with the selection of a next nearest network node from the ranked list for the primary customer location.

If the selected nearest network node for the primary customer location is the last nearest network node in the ranked list (YES—block 464), the exemplary process may continue in FIG. 4G with a determination of whether an acceptable load distribution has been achieved (block 468). An acceptable load distribution may include satisfying any number of load criteria set by the network planner that satisfies overall network latency goals and customer location density parameters. If an acceptable load distribution has been achieved (YES—block 468), the exemplary process may complete. If an acceptable load distribution has not been achieved (NO—block 468), a determination may be made whether the current primary customer location is the last customer location in the customer location list (block 470). If the current primary customer location is not the last customer location in the customer location list (NO—block 470), the exemplary process may return to block 438 (FIG. 4D) with the selection of a next customer location from the list of customer locations as the next primary customer location. If the current primary customer location is the last customer location in the customer location list (YES—block 470), a determination may be made whether an acceptable load distribution has been achieved (block 472). If an acceptable load distribution has been achieved (YES—block 472), the exemplary process may complete with the nearest network node ranked at the top of customer location's ranked list being the network node to which the respective customer location's access link should be connected for connecting to network 210. For example, if a given network node is at the top of customer location X's ranked list, the given network node is the network node to which customer location should be connected via an access link. If an acceptable load distribution has not been achieved (NO—block 472), the exemplary process may complete with a failure to distribute the customer location's access links across network nodes during network planning.

FIGS. 8A-8G are flow diagrams illustrating a second exemplary process for network planning that distributes customer locations across nodes of a provider network such that a desired load distribution may be achieved. The exemplary process of FIGS. 8A-8G may be implemented by network planning device 240. In other implementations, the exemplary process of FIGS. 8A-8G may be implemented by other devices in conjunction with network planning device 240, or by a device or devices other than network planning device 240. The exemplary process of FIGS. 8A-8G may include a sequence of instructions stored in a computer-readable medium (e.g., main memory 330, ROM 340 and/or storage device 350) that may be executed by processing unit 320 of network planning device 240.

The exemplary process may begin with the receipt of a list of customer locations for i customers (block 800). For example, referring back to FIG. 2B, network planning device 240 may receive x and y coordinates for each of customer locations 220-1 through 220-*i* in the x-y coordinate system of position mapping 250. The i customers may include, for example, a collection of customer locations proposed to be connected or re-connected to network 210. FIG. 5A depicts an example of a customer location list 500 that may be received by network planning device 240. As shown in FIG. 5A, customer location list 500 may include a list of multiple customer locations 510-1 through 510-N.

Locations of nodes $N_j$ in a network may be received (block 802). Referring also to FIG. 2B, x and y coordinates for each of network nodes 230-1 through 230-*j*, that correspond to existing network nodes in network 210, may be received. The j network nodes may include, for example, each network provider edge node in network 210 to which customer locations may be connected to obtain network service. FIG. 5B illustrates an exemplary network node location list 520 that may be generated that includes a list of the locations 530-1 through 530-*j* associated with, for example, each of the network provider edge nodes of network 210.

For each customer location in the list of customer locations, network nodes that are nearest to the customer location and within a specified distance range of the customer location may be identified (block 804). FIG. 6A depicts an illustrative example of the identification of the nearest network nodes to a customer location within a specified range of the customer location. As shown in FIG. 6A, network nodes 620-1 through 620-5 are identified as being the nearest network nodes within a distance range 630 of customer location 610. As further shown in FIG. 6A, network nodes 620-6 and 620-7 are outside of distance range 630 and, therefore, are not identified as nearest nodes to customer location 610. An increasing hierarchy of distance ranges may be specified with the first distance range being the shortest distance range and each subsequent distance range (e.g., selected in block 868 below) being longer and longer distance ranges extending out from the customer location. For example, a set of distance ranges may include 1 kilometer (km), 10 km and 100 km.

The identified nearest network nodes may be ranked for each customer location in an order from closest to farthest to generate a ranked list for each customer location (block 806). FIG. 6B depicts a distance determination being made for each of the identified nearest network nodes 620-1 through 620-5. FIG. 7 further shows nearest network nodes 620-1 through 620-5 ranked in a ranked list 700 as a result of the distances determined in FIG. 6B. As shown in FIG. 7, network node C 620-3 is determined to be the closest to customer location 610 and, therefore, is ranked first in list 700. Network node B 620-2 is determined to be second closest to customer location 610 and, therefore, is ranked second in list 700. Network node E 620-4 is determined to be third closest to customer location 610 and, therefore, is ranked third in list 700. Network node D 620-5 is determined to be fourth closest to customer location 610 and, therefore, is ranked fourth in list 700. Network node A 620-1 is determined to be fifth closest to customer location 610 and, therefore, is ranked fifth in list 700.

A next customer location may be selected from the list of customer locations (block 808). If this is the first execution of block 808 in the exemplary process of FIGS. 8A-8G, the "next customer location" may include the first customer location in the customer location list. If this is a subsequent execution of block 808 in the exemplary process of FIGS. 8A-8G, the "next customer location" may include each subsequent customer location contained in the customer location list.

A next nearest network node may be selected from the ranked list for the selected customer location (block 810). A next nearest network node may be selected from the ranked list of nearest network nodes obtained in block 806 above. If this is the first execution of block 810 in the exemplary process of FIGS. 8A-8G, the "next nearest network node" may include the first network node in the ranked list. If this is a subsequent execution of block 810, the "next nearest network node" may include subsequent nearest network nodes retrieved in order from the ranked list for the customer location.

A determination may be made whether the nearest network node is overloaded (block 812). A maximum loading threshold for each network node 230 in network 210 may be preset. The maximum loading threshold may be defined, for example, in terms of a maximum number of customer locations that may be connected to a single network node. The maximum loading threshold may be defined in conjunction with, or by, other parameters than the maximum number of customer locations. As a specific example, if the maximum loading threshold is set at 10 customer locations, and it is determined that the nearest network node to a given customer location already is loaded with 9 customer locations, it may be determined that connecting the given customer location to the nearest network node would overload the network node.

Figure 8A:
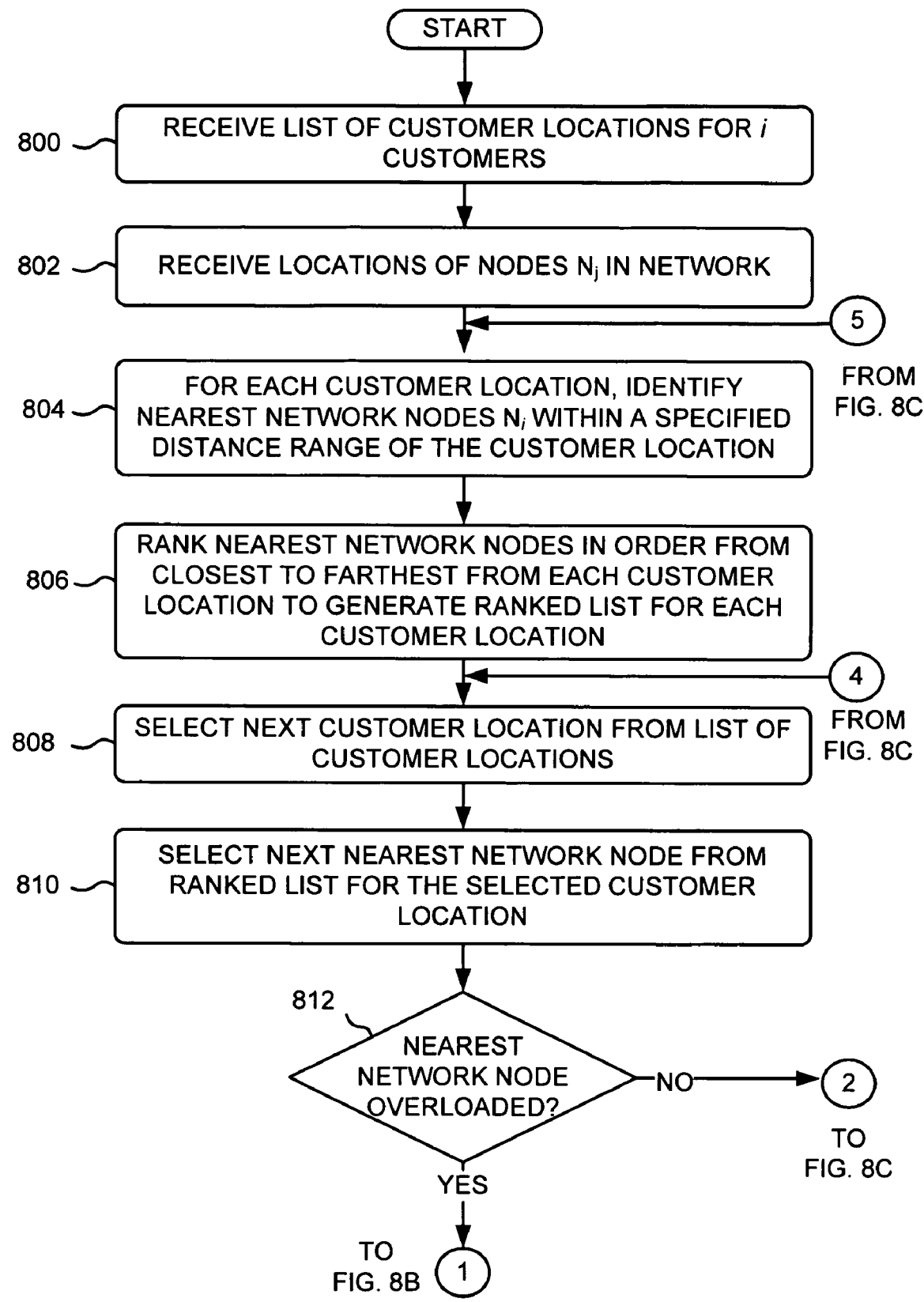
FIGS. 8A-8G are flow diagrams illustrating a second exemplary process for network planning that distributes customer locations across nodes of a provider network such that a desired load distribution may be achieved.
Figure 8B:
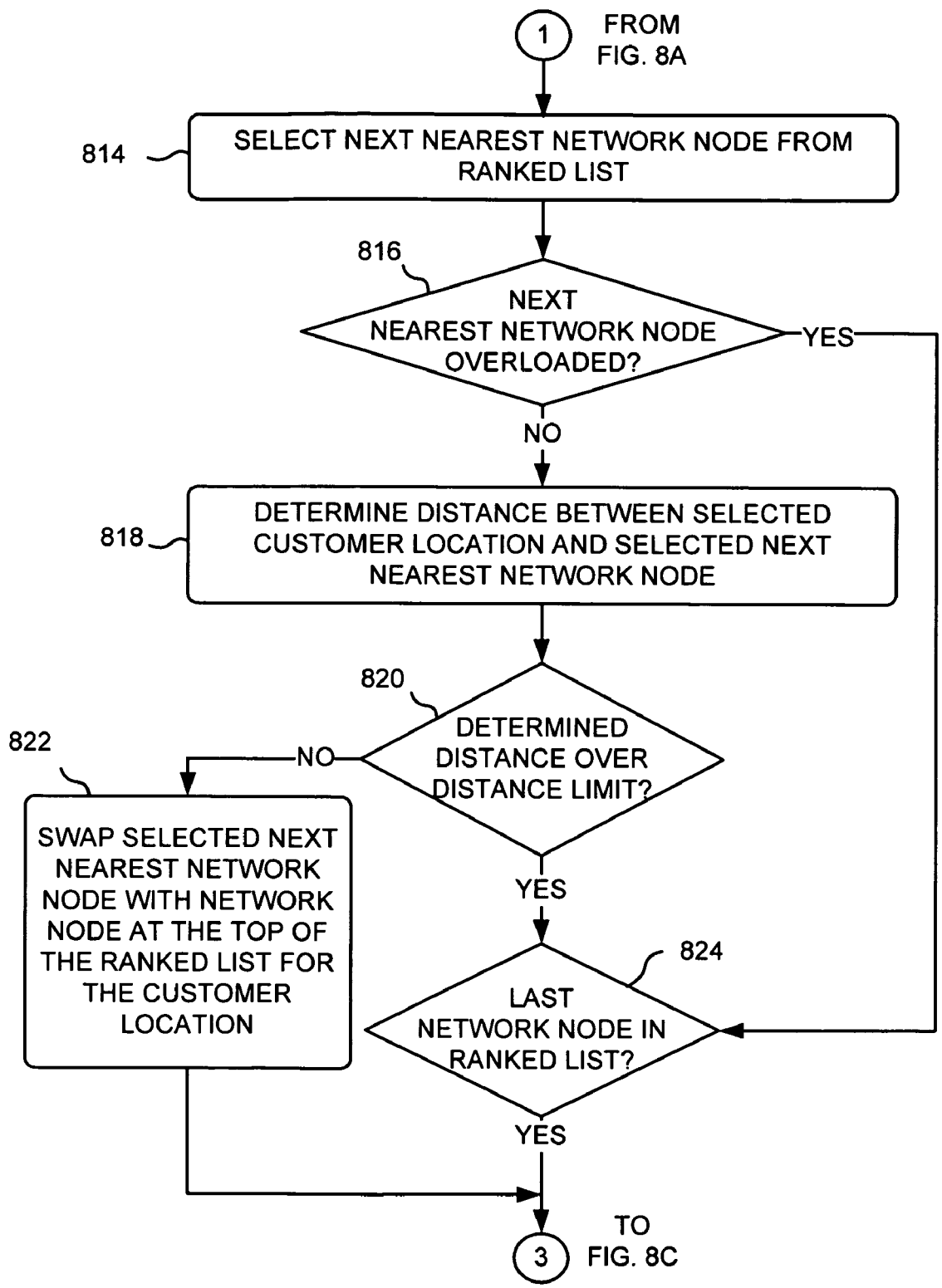
Figure 8C:
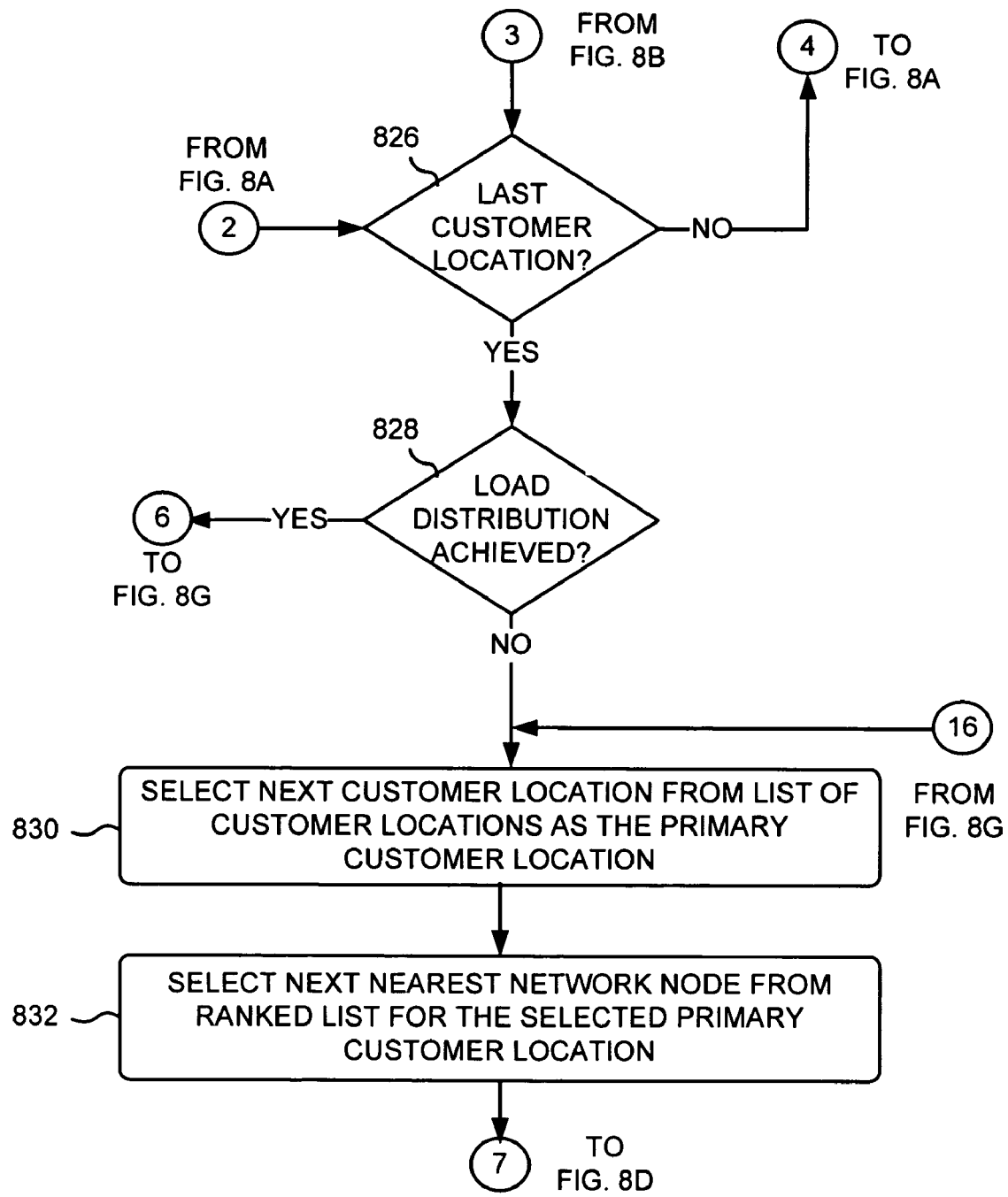
Figure 8D:
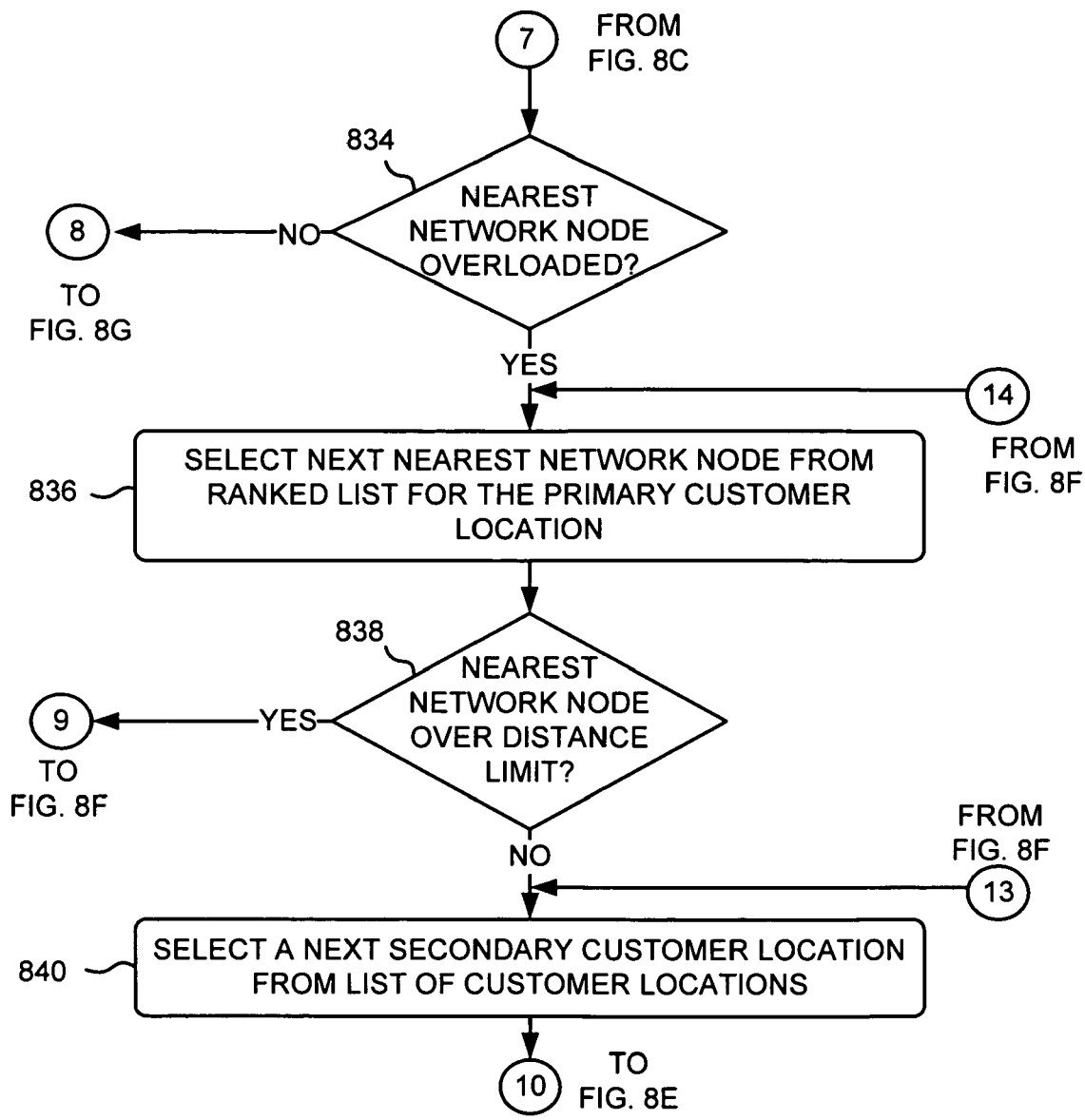
Figure 8E:
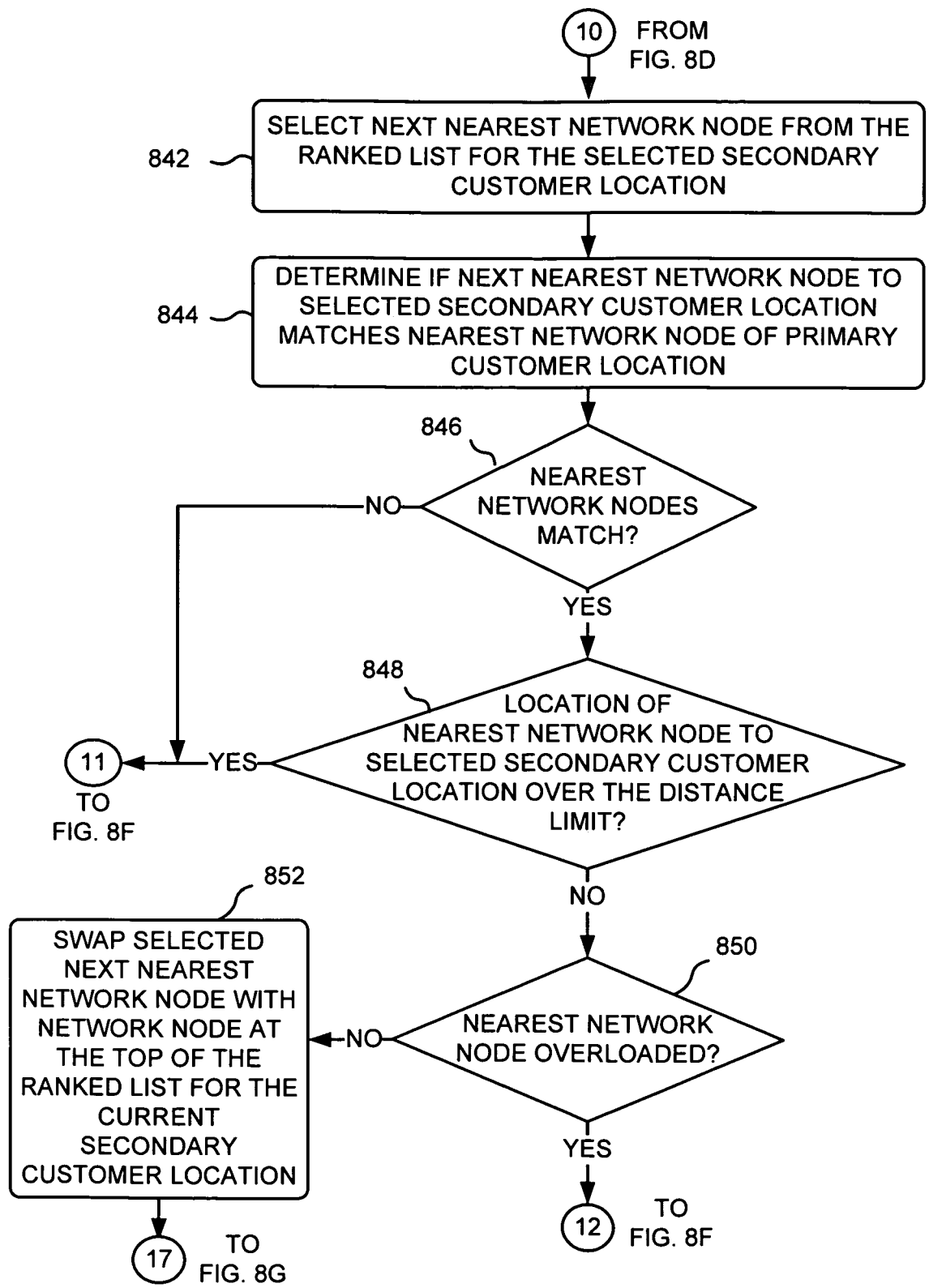

If the nearest network node is not overloaded (NO—block 812), the exemplary process may continue at block 826 in FIG. 8C with a determination of whether a last customer location in the customer location list has been processed. If the nearest network node is overloaded (YES—block 812), the exemplary process may continue in FIG. 4B with a next nearest network node being selected from the ranked list (block 814). The next nearest network node selected from the ranked list may include the next ranked network node in the ranked list after the previously selected network node. Referring to ranked network node list 700 of FIG. 7, if it is determined that network node C 620-3 is overloaded, network node B 620-2 may be selected from list 700 as the next ranked network node.

A determination may be made whether the next nearest network node is overloaded (block 816). The current loading of the selected nearest network node may be compared to the maximum loading threshold to determine if the network node will be overloaded by connection of the customer location to the network node. If the next nearest network node is overloaded (YES—block 816), the exemplary process may continue at block 824 below. If the next nearest network node is not overloaded (NO—block 816), a distance between the selected customer location and the selected next nearest network node may be determined (block 818). The distance may be determined in terms of a geographic distance, with the geographic distance serving as an indication of a latency associated with a connection between the customer location the network node.

If the determined distance is not over the pre-determined distance limit (NO—block 820), the selected next nearest network node may be swapped with a network node currently at the top of the ranked list for the customer location (block 822). A pre-determined distance limit may be set that limits the maximum distance that a given customer location may be from a given network node. This pre-determined distance limit may be based on a maximum desired latency between the given customer location and the given network node. If a comparison of a determined distance between the customer location and the nearest network node shows that the determined distance is less than the distance limit, the nearest network node may be swapped with the current network node at the top of the ranked list (i.e., with the network node at the top of the list being the best current candidate for serving the customer location). Referring to the example of FIG. 7, network node B 620-2 may be swapped with network node C 620-3 thereby moving network node B 620-2 into the first ranked position in list 700 and moving network node C 620-3 into the second ranked position in list 700.

If the determined distance is over the pre-determined distance limit (YES—block 820), a determination may be made whether the current selected next nearest network node is a last network node in the ranked list for the customer location (block 824). Referring to FIG. 7 as an example, if the current selected network node is network node D 620-5, it may be determined that there is still another network node in ranked list 700 (e.g., network node A 620-1) and that network node D 620-5 is not the last network node in the list. If the current selected nearest network node is not the last network node in the ranked list, the exemplary process may return to block 814 with the selection of a next nearest node from the ranked list for the customer location. Referring to FIG. 7 as an example, network node E 620-4 may be selected from ranked list 700 as the next nearest network node after network node B 620-2.

If the current selected next nearest network node is the last network node in the ranked list for the customer location (YES—block 824), the exemplary process may continue in FIG. 8C with a determination if the last customer location in the customer location list has been processed (block 826). If the last customer location in the customer location list has not been processed (NO—block 826), the exemplary process may return to block 808 with the selection of a next customer location from the list of customer locations. Referring to the example of FIG. 5A, if customer location 2 510-2 was the most recent customer location processed, customer location 3 510-1 may be selected from customer location list 500. If the last customer location in the customer location list has been processed (YES—block 826), a determination may be made whether an acceptable load distribution has been achieved (block 828). An acceptable load distribution may include satisfying any number of load criteria set by the network planner that satisfies overall network latency goals and customer location density parameters. If an acceptable load distribution has been achieved (YES—block 828), the exemplary process may be complete. If an acceptable load distribution has not been achieved (NO—block 828), a next customer location may be selected as the primary customer location from the list of customer locations (block 830). If this is the first time block 830 has been executed, the next customer location that is selected as the primary customer location may be the first customer location in the customer location list. If this is not the first time block 830 has been executed, a next customer location, that is subsequent to the previous customer location in the customer location list, may be selected as the primary customer location.

Figure 8F:
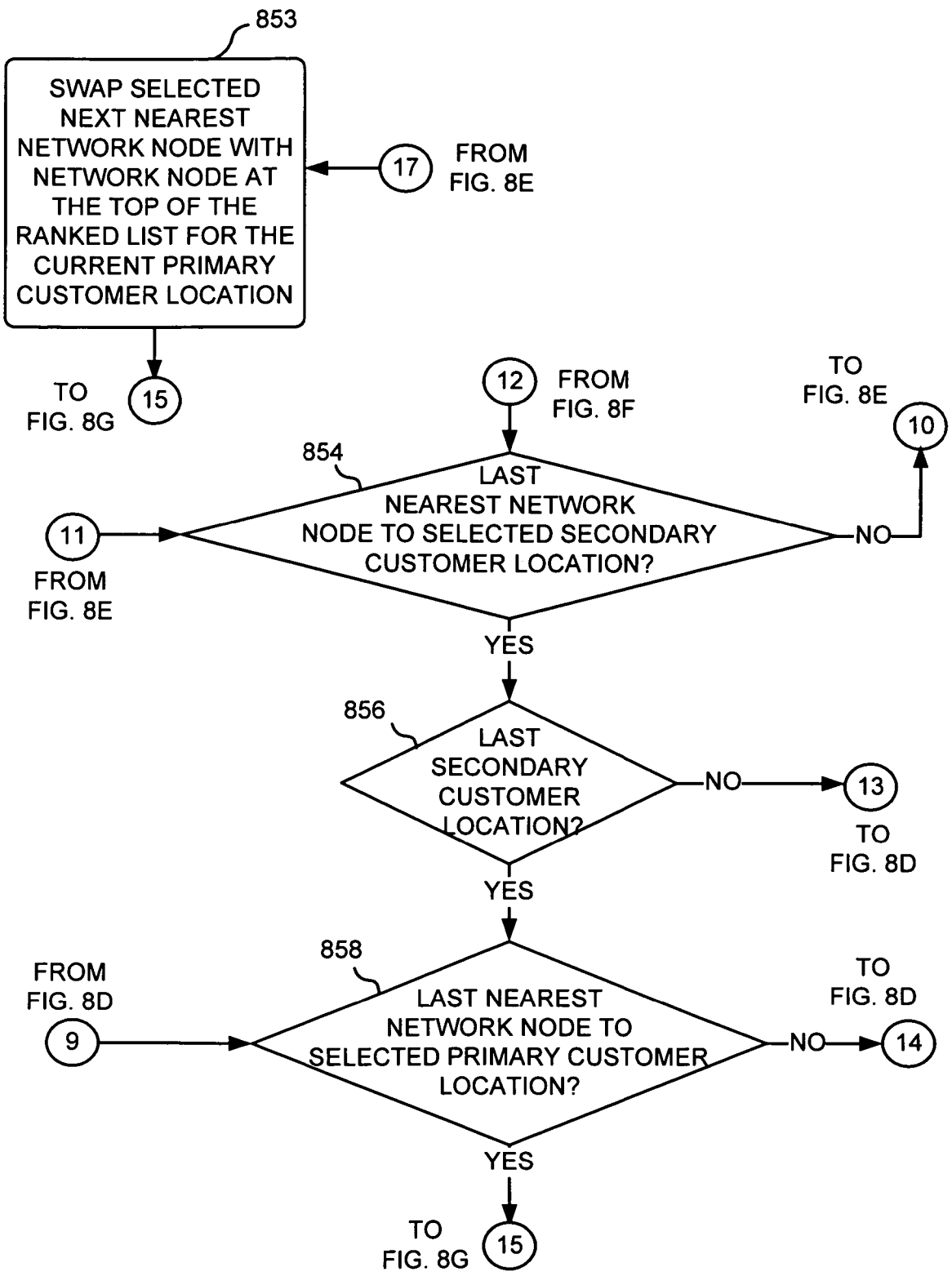
Figure 8G:
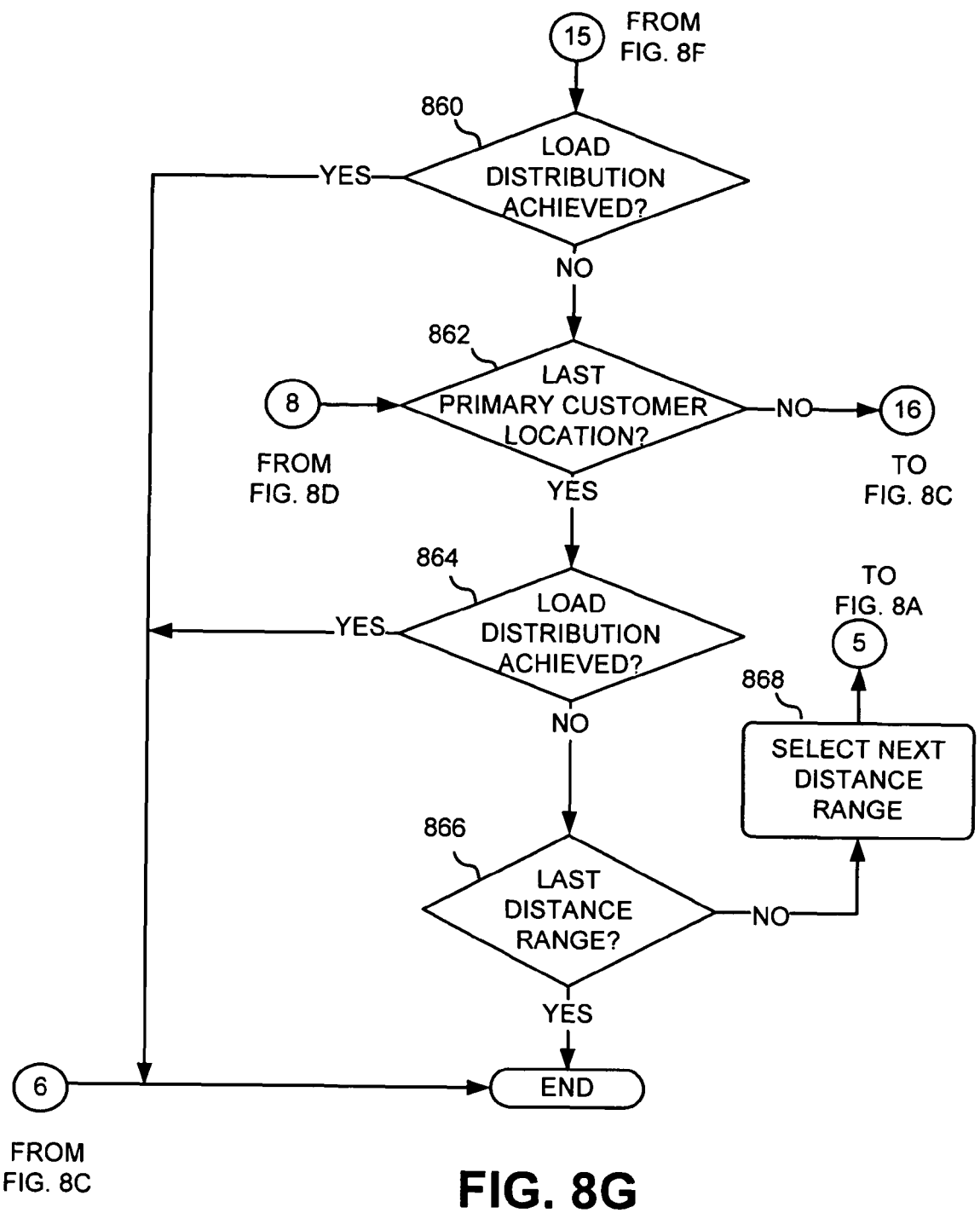

A next nearest network node may be selected from the ranked list for the primary customer location (block 832). It may be determined whether the nearest network node to the selected primary customer location is overloaded (block 834). The current loading of the nearest network node may be compared to the maximum loading threshold to determine if the network node will be overloaded by connection of the primary customer location to the network node. If the nearest network node is not overloaded (NO—block 834), the exemplary process may continue at block 862 below (FIG. 8G). If the nearest network node is overloaded (YES—block 834), a next nearest network node may be selected from the ranked list for the primary customer location (block 836). Thus, the network node ranked directly after the previous nearest network node may be selected from the ranked list.

It may be determined if the selected nearest network node is over a distance limit (block 838). A pre-determined distance limit may be set that limits the maximum distance that a given network node may be from a given customer location. This predetermined distance limit may be based on a maximum desired latency between the given network node and the given customer location. If the selected nearest network node is over the distance limit (YES—block 838), the exemplary process may continue at block 858 below (FIG. 8F). If the selected nearest network node is not over the distance limit (NO—block 838), a next secondary customer location may be selected from the list of customer locations (block 840). A next secondary customer location may include a customer location from the customer location list that is different than the primary customer location and that hasn't previously been selected as a secondary customer location.

A next nearest network node may be selected from the ranked list for the selected secondary customer location (block 842). The ranked list for the selected secondary customer location may be inspected and a next nearest network node may be selected from the list. If this is the first execution of block 842, the next nearest network node may include the first nearest network node in the ranked list. If this is not the first execution of block 842, the next nearest network node may include a network node ranked in the list after the previously selected nearest network node. Referring to FIG. 7 as an example of a ranked list of network nodes associated with a secondary customer location, network node C 620-3 may be selected from ranked list 700.

A determination may be made if the next nearest network node to the selected secondary customer location matches the nearest network node of the primary customer location (block 844). Therefore, the nearest network node selected in block 836 may be compared with the nearest network node selected in block 842. If the nearest network node for the secondary customer location does not match the nearest network node of the primary customer location (NO—block 846), the exemplary process may continue at block 854. If the next nearest node to the selected secondary customer location matches the nearest network node of the primary customer location (YES—block 846), a determination may be made whether the distance between the nearest network node and the selected secondary customer location is over the pre-determined distance limit (block 848). If so (YES—block 848), the exemplary process may continue at block 854 below (FIG. 8F).

If the distance between the nearest network node and the selected secondary customer location is not over the distance limit (NO—block 848), a determination may be made whether the nearest network node for the selected secondary customer location is overloaded (block 850). If so (YES—block 850), the exemplary process may continue at block 854 below (FIG. 8F). If the nearest network node for the selected secondary customer location is not overloaded (NO—block 850), the nearest network node for the selected secondary customer location may be swapped with the network node at the top of the ranked list for the current secondary customer location (block 852). The selected nearest network node for the current primary customer location may then be swapped with the network node at the top of the ranked list for the current primary customer location (block 853) (FIG. 8F). The exemplary process may continue at block 860 below (FIG. 8G).

At block 854, a determination may be made whether the current selected nearest network node for the selected secondary customer location is the last nearest network node in the secondary customer location's ranked list. If not (NO—block 854), the exemplary process may return to block 842 with the selection of a next nearest network node from the secondary customer location's ranked list. If the current selected nearest network node for the selected secondary customer location is the last nearest network node in the ranked list (YES—block 854), a determination may be made whether the selected secondary customer location is the last customer location in the customer location list (block 856). If not (NO—block 856), the exemplary process may return to block 840 (FIG. 8D) with the selection of a next secondary customer location from the list of customer locations. If the selected secondary customer location is the last customer location in the customer location list (YES—block 856), a determination may be made whether the selected nearest network node for the primary customer location is the last nearest network node in the primary customer location's ranked list (block 858). If not (NO—block 858), the exemplary process may return to block 836 above (FIG. 8D) with the selection of a next nearest network node from the ranked list for the primary customer location.

If the selected nearest network node for the primary customer location is the last nearest network node in the ranked list (YES—block 858), a determination may be made whether an acceptable load distribution has been achieved (block 860). An acceptable load distribution may include satisfying any number of load criteria set by the network planner that satisfies overall network latency goals and customer location density parameters. If an acceptable load distribution has been achieved (YES—block 860), the exemplary process may complete. If an acceptable load distribution has not been achieved (NO—block 860), a determination may be made whether the current primary customer location is the last primary customer location in the customer location list (block 862). If not (NO—block 862), the exemplary process may return to block 830 with the selection of a next customer location from the list of customer locations as the next primary customer location. If the current primary customer location is the last customer location in the customer location list (YES—block 862, a determination may be made whether an acceptable load distribution has been achieved (block 864). If so (YES—block 864), the exemplary process may complete with the nearest network node ranked at the top of customer location's ranked list being the network node to which the respective customer location's access link should be connected for connecting to network 210. For example, if network node A is at the top of customer location X's ranked list, network node A is the network node to which customer location should be connected via an access link.

If an acceptable load distribution has not been achieved (NO—block 864), a determination may be made whether a last distance range has been reached (block 866). The last distance range may include the highest distance range in the hierarchy of pre-determined distance ranges specified by the network planner. If there are additional distance ranges to be covered (NO—block 866), a next distance range may be selected 868 and the exemplary process may return to block 804, with the identification of the nearest network nodes within the selected next distance range of each customer location of the customer location list. For example, if the set of pre-determined distance ranges comprises 1 km, 10 km and 100 km, then the 10 km distance range may be selected after completion of the 1 km distance range. If there are no additional distance ranges to be covered (YES—block 866), the exemplary process may complete with the nearest network node ranked at the top of each customer location's ranked list being the network node to which the respective customer location's access link should be connected for connecting to network 210. For example, if a given network node is at the top of customer location X's ranked list, the given network node is the network node to which customer location should be connected via an access link.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 4A-4G and 8A-8G, the order of the blocks may be modified in other embodiments. Further, non-dependent blocks may be performed in parallel.

It will be apparent that aspects described herein may be implemented in many different forms of software, firmware, and hardware in the implementations illustrated in the figures. The actual software code or specialized control hardware used to implement embodiments is not limiting of the invention. Thus, the operation and behavior of these aspects were described without reference to the specific software code, it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium containing instructions executable by at least one processor, the computer-readable medium comprising:
    one or more instructions for obtaining a list of customer locations proposed to be connected to a network;
    one or more instructions for obtaining a list of locations of network nodes of a network that is capable of providing network service to the customer locations;
    one or more instructions for identifying nearest network nodes to a first customer location of the customer locations;
    one or more instructions for ranking the identified nearest network nodes in order from closest to farthest from the first customer location to produce a ranked list;
    one or more instructions for stepping through each network node in the ranked list until a network node is identified which will not be placed in an overloaded state if the first customer location is connected to the network node; and
    one or more instructions for selecting the identified network node as the access node for the first customer location.

2. The non-transitory computer-readable medium of claim 1, where the network nodes comprise network provider edge (PE) nodes.

3. The non-transitory computer-readable medium of claim 1, where the customer locations each comprise one of customer premises equipment (CPE) or an additional network.

4. The non-transitory computer-readable medium of claim 1, further comprising:
    one or more instructions for selecting a first distance range extending out from the first customer location,
    where the one or more instructions for identifying nearest network nodes further comprises one or more instructions for identifying the nearest network nodes to the first customer location within the distance range.

5. The non-transitory computer-readable medium of claim 4, further comprising:
    one or more instructions for selecting a second distance range extending out from the first customer location,
    one or more instructions for identifying nearest network nodes to a first customer location of the customer locations within the second distance range;
    one or more instructions for ranking the identified nearest network nodes in order from closest to farthest from the first customer location to produce a second ranked list;
    one or more instructions for stepping through each network node in the second ranked list until a network node is identified which will not be placed in an overloaded state if the first customer location is connected to the network node; and
    one or more instructions for selecting the identified network node as the access node for the first customer location.

6. The non-transitory computer-readable medium of claim 1, further comprising:
    one or more instructions for determining if a distance between the identified network node and the first customer location is less than a distance limit,
    where selecting the identified network node as the access node for the first customer location is based on whether the distance is less than the distance limit.

7. The non-transitory computer-readable medium of claim 1, further comprising:
    one or more instructions for determining if selection of the identified network node as the access node for the first customer location achieves a certain load distribution.

8. The non-transitory computer-readable medium of claim 7, where the certain load distribution satisfies a specified load criterion that further satisfies overall network latency goads and customer location density parameters.

9. The non-transitory computer-readable medium of claim 1, further comprising:
    one or more instructions for identifying nearest network nodes to a second customer location of the customer locations, where the second customer location is different than the first customer location;
    one or more instructions for ranking the identified nearest network nodes in order from closest to farthest from the second customer location to produce a ranked list;
    one or more instructions for stepping through each network node in the ranked list until a network node is identified which will not be placed in an overloaded state if the second customer location is connected to the network node; and
    one or more instructions for selecting the identified network node as the access node for the second customer location.

10. A computing-device implemented method, comprising:
    obtaining a list of customer locations proposed to be connected to a network;
    obtaining a list of locations of network nodes of the network that is capable of providing network service to the customer locations;
    identifying nearest network nodes to a first customer location of the customer locations;
    ranking the identified nearest network nodes in order from closest to farthest from the first customer location to produce a ranked list;
    stepping through each network node in the ranked list until a network node is identified which will not be placed in an overloaded state if the first customer location is connected to the network node;
    determining if a distance between the identified network node and the first customer location is less than a distance limit; and selecting the identified network node as the access node for the first customer location based on whether the distance is less than the distance limit.

11. The computing-device implemented method of claim 10, further comprising:
selecting a first distance range extending out from the first customer location,
where identifying nearest network nodes further comprises identifying the nearest network nodes to the first customer location within the distance range.

12. The computing-device implemented method of claim 11, further comprising:
selecting a second distance range extending out from the first customer location,
identifying nearest network nodes to a first customer location of the customer locations within the second distance range;
ranking the identified nearest network nodes in order from closest to farthest from the first customer location to produce a second ranked list;
stepping through each network node in the second ranked list until a network node is identified which will not be placed in an overloaded state if the first customer location is connected to the network node; and
selecting the identified network node as the access node for the first customer location.

13. The computing-device implemented method of claim 10, further comprising:
determining if a distance between the identified network node and the first customer location is less than a distance limit,
where selecting the identified network node as the access node for the first customer location is based on whether the distance is less than the distance limit.

14. The computing-device implemented method of claim 10, further comprising:
determining if selection of the identified network node as the access node for the first customer location achieves a certain load distribution.

15. The computing-device implemented method of claim 14, where the certain load distribution satisfies a specified load criterion that further satisfies overall network latency goals and customer location density parameters.

16. The computing-device implemented method of claim 10, where the network nodes comprise network provide edge (PE) nodes and where the customer locations each comprise one of customer premises equipment (CPE) or an additional network.

17. A computing-device, comprising:
means for obtaining a list of customer locations proposed to be connected to a network;
means for obtaining a list of locations of network nodes of the network that is capable of providing network service to the customer locations;
means for selecting a first customer location from the list of customer locations;
means for identifying nearest network nodes to the first customer location;
means for ranking the identified nearest network nodes to the first customer location in order from closest to farthest from the first customer location to produce a first ranked list;
means for selecting a second customer location from the list of customer locations;
means for identifying nearest network nodes to the second customer location;
means for ranking the identified nearest network nodes to the second customer location in order from closest to farthest from the second customer location to produce a second ranked list;
means for selectively stepping through each network node in the first ranked list and the second ranked list and comparing the respective network nodes in the first and second ranked lists to determine if the respective nodes are the same network node; and
means for swapping the same network node with a network node at a top of the first ranked list and for swapping the same network node with a network node at a top of the second ranked list.

18. The computing-device of claim 17, where the network nodes comprise network provider edge (PE) nodes.

19. The computing-device of claim 17, where the customer locations each comprise one of customer premises equipment (CPE) or an additional network.

20. The computing-device of claim 17, further comprising:
means for selecting a first distance range extending out from the first customer location,
where the means for identifying nearest network nodes to the first customer location further comprises means for identifying the nearest network nodes to the first customer location within the first distance range.

* * * * *